(12) United States Patent
Javed et al.

(10) Patent No.: US 9,917,923 B2
(45) Date of Patent: Mar. 13, 2018

(54) BUILDING MESSAGE RELATIONSHIPS FOR OFFLINE OPERATION OF AN ENTERPRISE APPLICATION

(71) Applicant: ORACLE INTERNATIONAL CORPORATION, Redwood Shores, CA (US)

(72) Inventors: Shoaib Javed, Tamil Nadu (IN); Filipe Leahy-Dios, Bracknell (GB); Michael Patrick Rodgers, Orange, CA (US); Gurbinder Singh Bali, Highlands Ranch, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 220 days.

(21) Appl. No.: 14/791,139

(22) Filed: Jul. 2, 2015

(65) Prior Publication Data
US 2016/0094497 A1 Mar. 31, 2016

Related U.S. Application Data

(60) Provisional application No. 62/055,841, filed on Sep. 26, 2014.

(51) Int. Cl.
*H04L 12/58* (2006.01)
*H04L 29/06* (2006.01)
(Continued)

(52) U.S. Cl.
CPC ........ *H04L 67/42* (2013.01); *G06F 17/30861* (2013.01); *H04W 4/18* (2013.01)

(58) Field of Classification Search
CPC ......... H04L 67/06; H04L 67/10; H04L 67/22; H04L 67/42; H04L 67/1095; G06F 17/30861; G06F 17/30899
(Continued)

(56) References Cited

U.S. PATENT DOCUMENTS

2007/0078950 A1* 4/2007 Hopkins ........... G06F 17/30861
709/217
2007/0299915 A1* 12/2007 Shraim ................ G06Q 10/107
709/206

(Continued)

OTHER PUBLICATIONS

Riva C, Laitkorpi M. Designing web-based mobile services with REST. InInternational Conference on Service-Oriented Computing Sep. 17, 2007 (pp. 439-450). Springer Berlin Heidelberg.*

*Primary Examiner* — Ranodhi Serrao
*Assistant Examiner* — James Fiorillo
(74) *Attorney, Agent, or Firm* — Vista IP Law Group, LLP

(57) ABSTRACT

A system, method, and computer program product for building JSON message relationships for offline operation of an enterprise application is presented. The claimed embodiments address the problem of mobile application behavior during periods of limited access to backend application services and data. More specifically, some embodiments are directed to approaches for capturing request and response information communicated between a client device and application server when connected by a network, and storing respective relationships using the captured information. The stored requests and responses and respective relationships are used to emulate the backend services provided by the application server when the client device is disconnected from the network. In one or more embodiments, a crawler on the client device can generate simulated online requests to build a set of information for use by the emulator when the client device is disconnected from the application server.

21 Claims, 20 Drawing Sheets

(51) Int. Cl.
*G06F 17/30* (2006.01)
*H04W 4/18* (2009.01)

(58) Field of Classification Search
USPC ......... 709/203, 204, 206, 217, 224; 707/617
See application file for complete search history.

(56) References Cited

U.S. PATENT DOCUMENTS

| | | | |
|---|---|---|---|
| 2009/0157627 A1* | 6/2009 | Arthursson | G06F 9/45504 |
| 2009/0240935 A1* | 9/2009 | Shukla | G06F 9/44505 713/100 |
| 2009/0282125 A1* | 11/2009 | Jeide | H04L 67/1095 709/217 |
| 2010/0169407 A1* | 7/2010 | Hsueh | G06F 9/52 709/203 |
| 2012/0278473 A1* | 11/2012 | Griffiths | G06F 17/30194 709/224 |
| 2014/0040195 A1* | 2/2014 | Elliott | G06F 17/30899 707/617 |
| 2014/0052840 A1* | 2/2014 | Shukla | G06F 9/44505 709/223 |
| 2014/0101248 A1* | 4/2014 | Felder | H04L 67/22 709/204 |
| 2015/0087276 A1 | 3/2015 | Carter et al. | |
| 2015/0088602 A1 | 3/2015 | Carter et al. | |
| 2015/0089470 A1 | 3/2015 | Shakespeare et al. | |
| 2016/0080493 A1* | 3/2016 | Roth | G06F 9/45529 709/203 |
| 2016/0239510 A1* | 8/2016 | Nagorny | G06F 8/61 |
| 2016/0342805 A1* | 11/2016 | Lim | G06F 17/3089 |
| 2017/0255341 A1* | 9/2017 | Trefler | G06F 3/0481 |

* cited by examiner

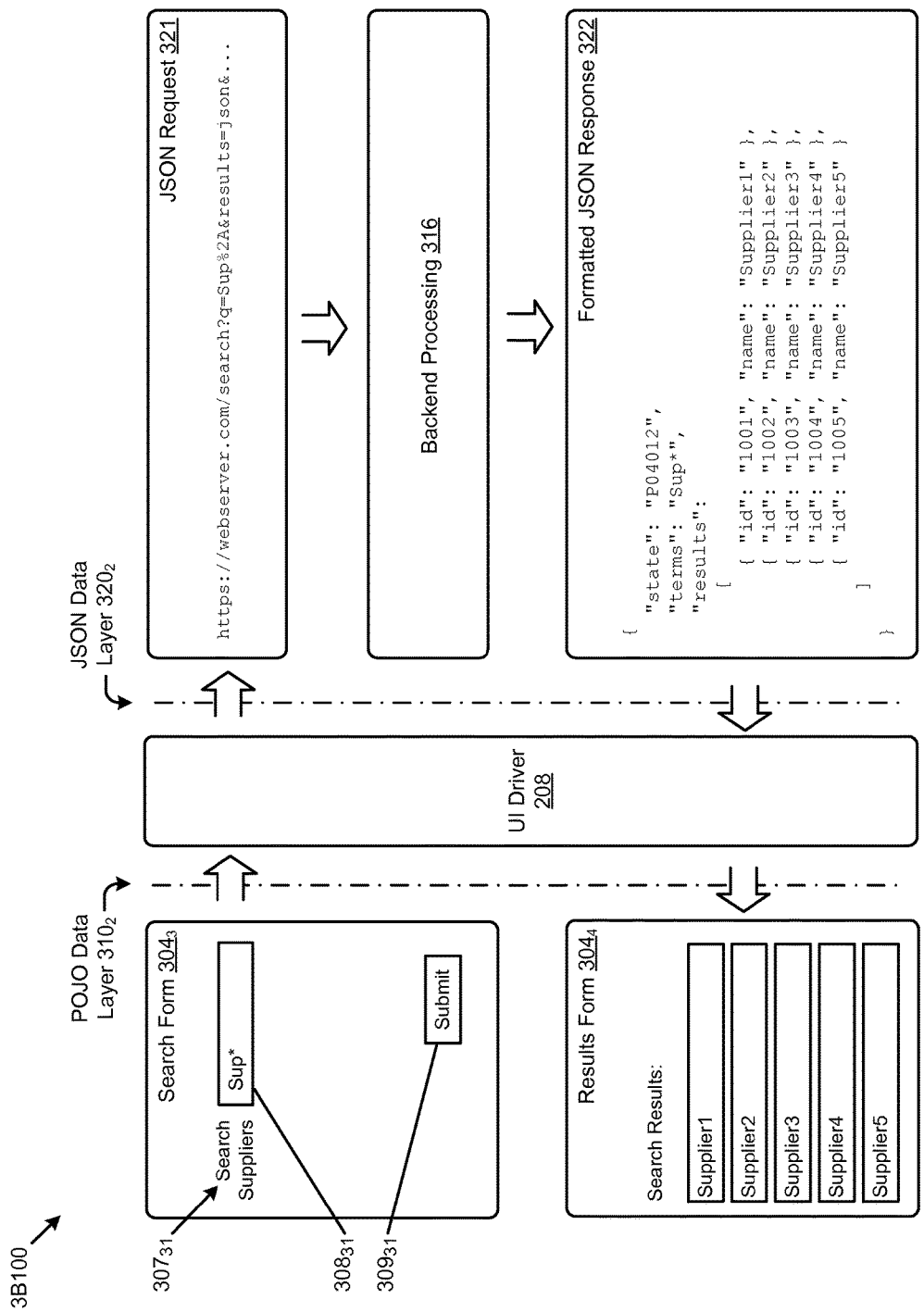
FIG. 3B1

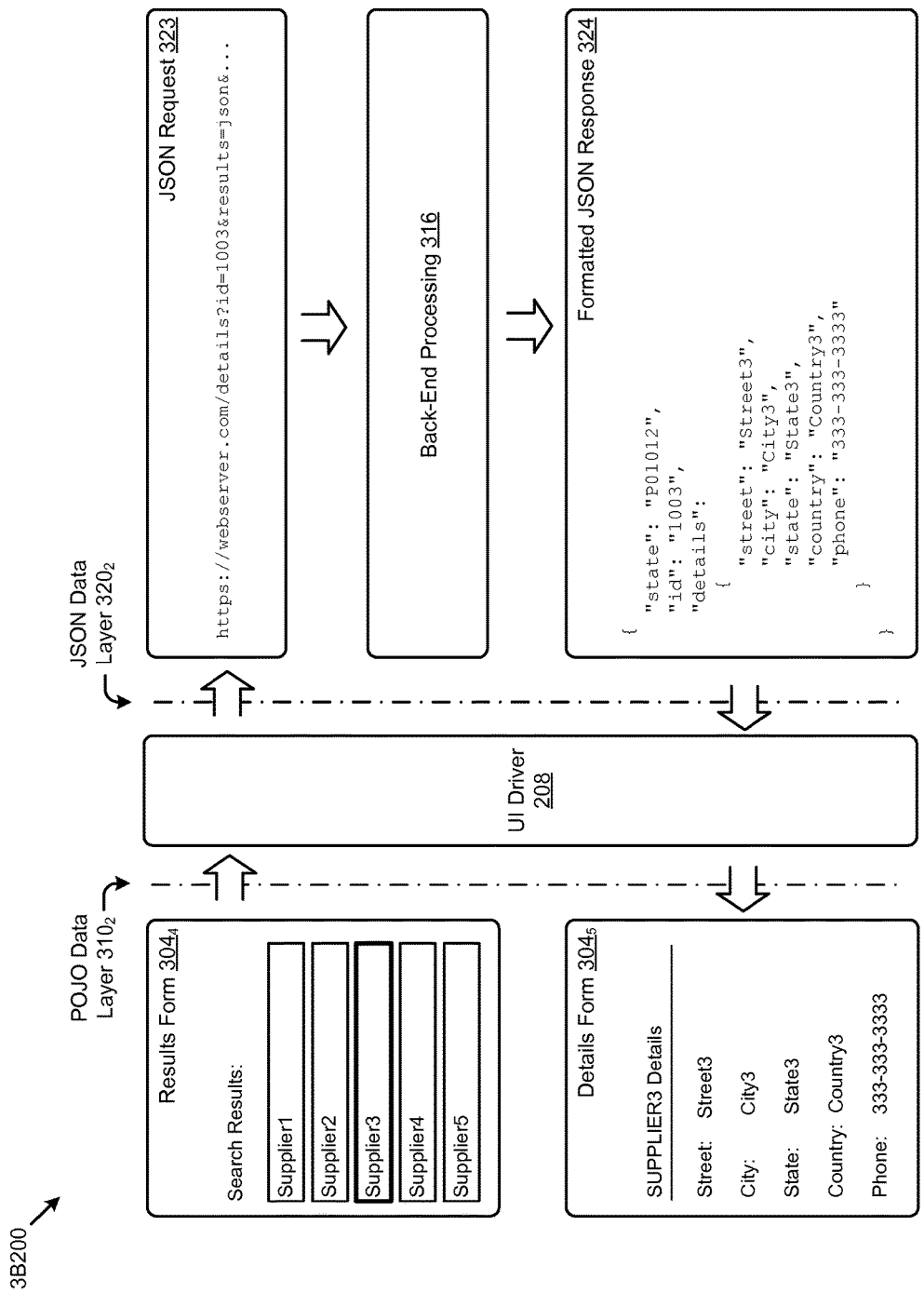
FIG. 3B2

BUILDING MESSAGE RELATIONSHIPS FOR OFFLINE OPERATION OF AN ENTERPRISE APPLICATION

RELATED APPLICATIONS

The present application claims the benefit of priority to U.S. Provisional Patent Application Ser. No. 62/055,841, entitled "BUILDING JSON MESSAGE RELATIONSHIPS FOR OFFLINE OPERATION OF AN ENTERPRISE APPLICATION", filed Sep. 26, 2014; which is hereby incorporated by reference in its entirety.

FIELD

This disclosure relates to the field of mobile enterprise applications, and more particularly to techniques for building message relationships for offline operation of an enterprise application.

BACKGROUND

The proliferation of mobile devices (e.g., smartphones, tablets, etc.) has been a great enabler for the mobile worker at all levels of operation in a business. Mobile capability on "any device" is a necessity for today's business applications (e.g., enterprise applications). While there are numerous enterprise applications addressing various business requirements, many are often only operational while a user is online (e.g., when a mobile device can access the application and related data from remote web services over the Internet via a cellular, WLAN, or LAN connection).

Although cellular networks (e.g., 3G LTE, 2G, etc.) today have a wider reach and faster data rates than ever before, they are still relatively slow (e.g., compared to WLAN and LAN) and sometimes unreliable. At times, connections through a cellular network can be completely unavailable during certain time periods and/or within certain "dead zones" (e.g., tunnels). During such periods of intermittent or zero connectivity (e.g., when the mobile device is offline) it is desirable to enable mobile users to continue to use their enterprise applications from mobile devices without interruption.

Techniques are needed to address the problem of mobile application behavior during periods of limited access to backend application services and data.

None of the aforementioned legacy approaches achieve the capabilities of the herein-disclosed techniques for building message relationships for offline operation of an enterprise application. Therefore, there is a need for improvements.

SUMMARY

The present disclosure provides improved systems, methods, and computer program products suited to address the aforementioned issues with legacy approaches. More specifically, the present disclosure provides a detailed description of techniques used in systems, methods, and in computer program products for building message relationships for offline operation of an enterprise application. The claimed embodiments address the problem of mobile application behavior during periods of limited access to backend application services and data. More specifically, some embodiments are directed to approaches for capturing request and response behavior for emulation of backend services during periods of limited network availability to backend data, which embodiments advance the technical fields for addressing the problem of mobile application behavior during periods of limited access to backend application services and data, as well as advancing peripheral technical fields. Some embodiments and techniques thereto improve the functioning of multiple systems within the disclosed environments.

In an embodiment, a client device (e.g., mobile device) is connected to an application server by a network and running an enterprise application hosted on the application server. A module on the client device stores message relationships in a local database (e.g., in a client-local relational database, or in a client-local memory). The relationships associate online requests and respective responses (e.g., in JSON format) that are communicated to and from the application server. An emulator on the client device can then receive offline requests and deliver offline responses when the client device is disconnected from the application server. The offline responses generated from the local database can appear the same as online responses from the application server such that use of the enterprise application is uninterrupted during offline periods. In one or more embodiments, a crawler on the client device can generate simulated online requests to simulate additional online activity records for storage in the local database for use by the emulator when the client device is disconnected from the application server.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 3B1 and FIG. 3B2 present use cases to illustrate emulation techniques used in systems for offline operation of an enterprise application, according to some embodiments.

DETAILED DESCRIPTION

Figure 1A:
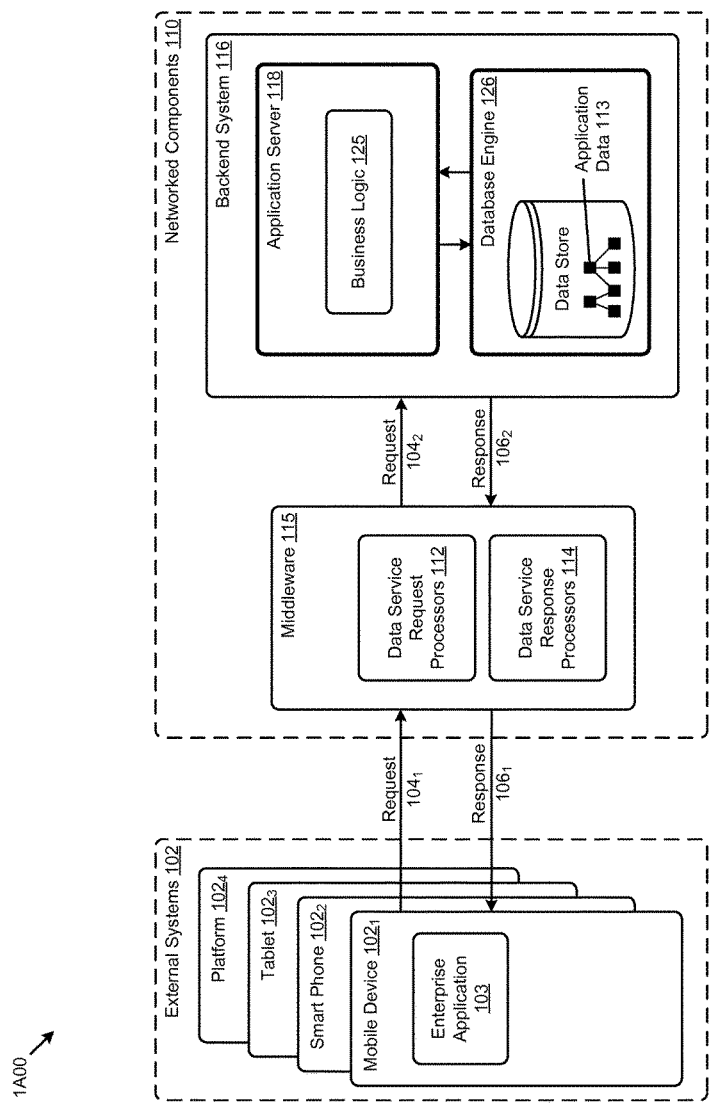
FIG. 1A exemplifies an environment where a mobile application communicates with a database engine hosted in a backend system.

Some embodiments of the present disclosure address the problem of mobile application behavior during periods of limited access to backend application services and data and some embodiments are directed to approaches for capturing request and response behavior for emulation of backend services during periods of limited network availability to backend data. More particularly, disclosed herein and in the accompanying figures are exemplary environments, systems, methods, and computer program products for building JSON message relationships for offline operation of an enterprise application.

Overview

The proliferation of mobile devices (e.g., smartphones, tablets, etc.) has been a great enabler for the mobile worker at all levels of operation in a business. Mobile capability on "any device" is a necessity for today's business applications (e.g., enterprise applications). While there are numerous enterprise applications addressing various business requirements, many are often only operational while a user is online (e.g., when a mobile device can access the application and related data from remote web services over the Internet via a cellular, WLAN, or LAN connection). Unfortunately there are certain situations where mobile networks are either restricted (e.g., hospitals, government buildings, fuel stations, etc.) or are not available for all protocols. There are also zones where it is not possible to provide a mobile network (e.g., deep sea oil rigs, airplanes, mountain peaks, or other geographic "dead zones"). Even when a mobile network (e.g., a cellular network) is available, it is sometimes desirable to restrict its usage by policy in order to avoid carrier data costs (e.g., as compared to a Wi-Fi connection). Even considering such restricted or absent mobile network connectivity, users still want to use their mobile devices to conduct business using their enterprise mobile applications. This disclosure describes techniques for enabling business users to continue to use their enterprise applications when their mobile devices are offline.

Legacy techniques for connected mobile enterprise applications render the visual layer (e.g., user interface) based on data exchanged with the enterprise or application server. Legacy techniques send a request to an enterprise application in the form of a message (e.g., an "enterprise application" request) and receive a response in the form of a message from the enterprise application (e.g., an "enterprise application" response). A web-based enterprise application or web client ingests user inputs carried in the request (e.g., formatted into appropriate "visual" fields) and then performs a user-defined physical action on the form (e.g., emulating a click action for a "Find" or "OK" button). The subsequent visual state of the application (e.g., page, form, etc.) along with the data retrieved is packed into a response as a "snapshot" and shared with the mobile application. The mobile application then extracts the data from the snapshot (e.g., a JSON response) and renders it as a visual user interface appropriate for the mobile user. The mobile application can be oblivious of underlying business logic and the enterprise relational database, and the data it contains. The architecture serves to completely abstract the underlying enterprise relational database. In order for the mobile enterprise application to function while offline, enterprise data needs to be stored locally on the mobile device. Depending on the nature of the application, this technique can present insurmountable challenges (e.g., the need to store huge amounts of data on the mobile device, the problems associated with shared records, etc.).

To address the aforementioned problem, the techniques described herein use systems and methods to capture JSON messages sent between the mobile web client and the enterprise application, and store the JSON messages and their relationships in a local database. The local database can be built from user activity and/or using a crawler to simulate a broader set of messages and relationships. For example, when the mobile device is offline, an emulator can receive JSON requests and generate JSON responses from the local JSON store to allow the user to continue using the mobile application. The JSON messages provided by the emulator are identical to those provided by the enterprise application when online, simplifying the web client code and providing a seamless user transition between online and offline modes. Entry into an offline mode can occur when the mobile application cannot communicate with the enterprise application (e.g., when the enterprise application is not operational, or when networked components in the path between the mobile application and the enterprise application are not operational).

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Descriptions of Exemplary Embodiments

Reference is now made in detail to certain embodiments. The disclosed embodiments are not intended to be limiting of the claims.

FIG. 1A exemplifies an environment 1A00 where a mobile application communicates with a database engine hosted in a backend system. As an option, one or more instances of environment 1A00 or any aspect thereof may be implemented in the context of the architecture and functionality of the embodiments described herein. Also, environment 1A00 or any aspect thereof may be implemented in any desired environment.

Environment 1A00 depicts an example of an enterprise application 103 operating on various instances of external systems 102 (e.g., a mobile device $102_1$, a smart phone $102_2$, a tablet $102_3$, a phablet, a platform $102_4$, etc.) and accessing (e.g., through a network connection) a set of application data 113 provided by a set of networked components 110. Specifically, enterprise application 103 on mobile device $102_1$ can communicate with middleware 115 using various requests (e.g., request $104_1$) and responses (e.g., response $106_1$) using various protocols. Middleware 115 can comprise any of a variety of data service request processors 112 and data service response processors 114. Requests from the external systems 102 can be processed by the data service request processors 112 and forwarded (e.g., see request $104_2$) to a backend system 116 for additional processing. Responses from the backend system 116 (e.g., see response $106_2$) can be processed by the data service response processors 114 and returned (e.g., see response $106_1$) to the external systems 102. In some cases, the data service request processors 112 and the data service response processors 114 can translate requests and responses, respectively, between various formats and protocols (e.g., JSON, app-specific API, etc.).

A backend system 116 can comprise an application server 118 (e.g., a Java application server, JAS) to execute a set of business logic 125 and other processes and operations. Backend system 116 can further comprise a database engine 126 controlling access to a data store which holds the application data 113 (e.g., relational data, flat data, raw data, metadata, etc.). As an example, request $104_1$ from enterprise application 103 can represent a request initiated by an action to produce a historical sales chart (e.g., for customer "ABC" for year "2014"). Request $104_1$ can be translated by one or more data service request processors 112 and sent as request $104_2$ to backend system 116. Business logic 125 will process the data in request $104_2$ such that the appropriate set of data for the chart will be pulled by database engine 126 from the application data 113. The pulled data can then be sent back as response $106_2$ and response $106_1$ for display by enterprise application 103.

In the case shown in environment 1A00, a significant portion of the functionality of enterprise application 103 can reside on the external systems 102 (e.g., a "thick client"). However, external systems 102 still rely on networked components 110 (e.g., backend system 116, middleware 115, etc.) for additional functionality (e.g., business logic 125) and external systems 102 often relies a large set of shared data (e.g., application data 113). In some situations, a portion of the function and data of the networked components 110 can be emulated (e.g., when the external systems 102 have been disconnected from the networked components 110), and an emulator can be deployed to one or more external systems 102. Such a situation is shown and discussed as pertaining to FIG. 1B.

Figure 1B:
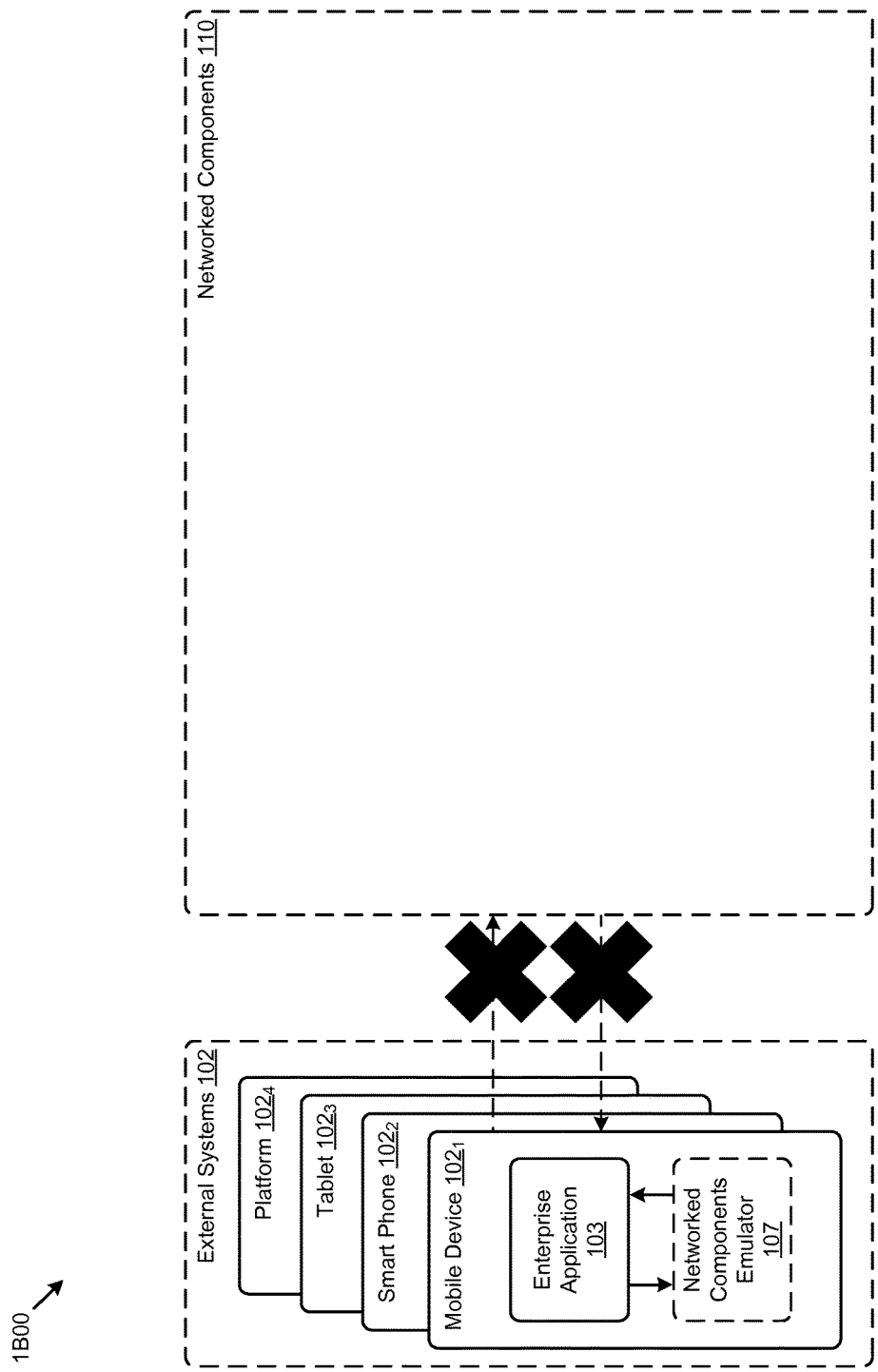
FIG. 1B exemplifies an environment where a mobile application relies on an emulator in lieu of communication with a backend system, according to an embodiment.

FIG. 1B exemplifies an environment 1B00 where a mobile application relies on an emulator in lieu of communication with a backend system. As an option, one or more instances of environment 1B00 or any aspect thereof may be implemented in the context of the architecture and functionality of the embodiments described herein. Also, environment 1B00 or any aspect thereof may be implemented in any desired environment.

As shown in FIG. 1B, the external systems 102 have been disconnected from the networked components 110 (e.g., mobile device $102_1$ is offline). In this case, the enterprise application 103 relies on a networked components emulator 107 to represent a portion of the function and data provided by the networked components 110. Networked components emulator 107 offers a range of capability to the mobile user; however, in certain situations (e.g., when application data 113 is large, complex, accessed by multiple users, etc.) additional techniques are required.

Figure 2A:
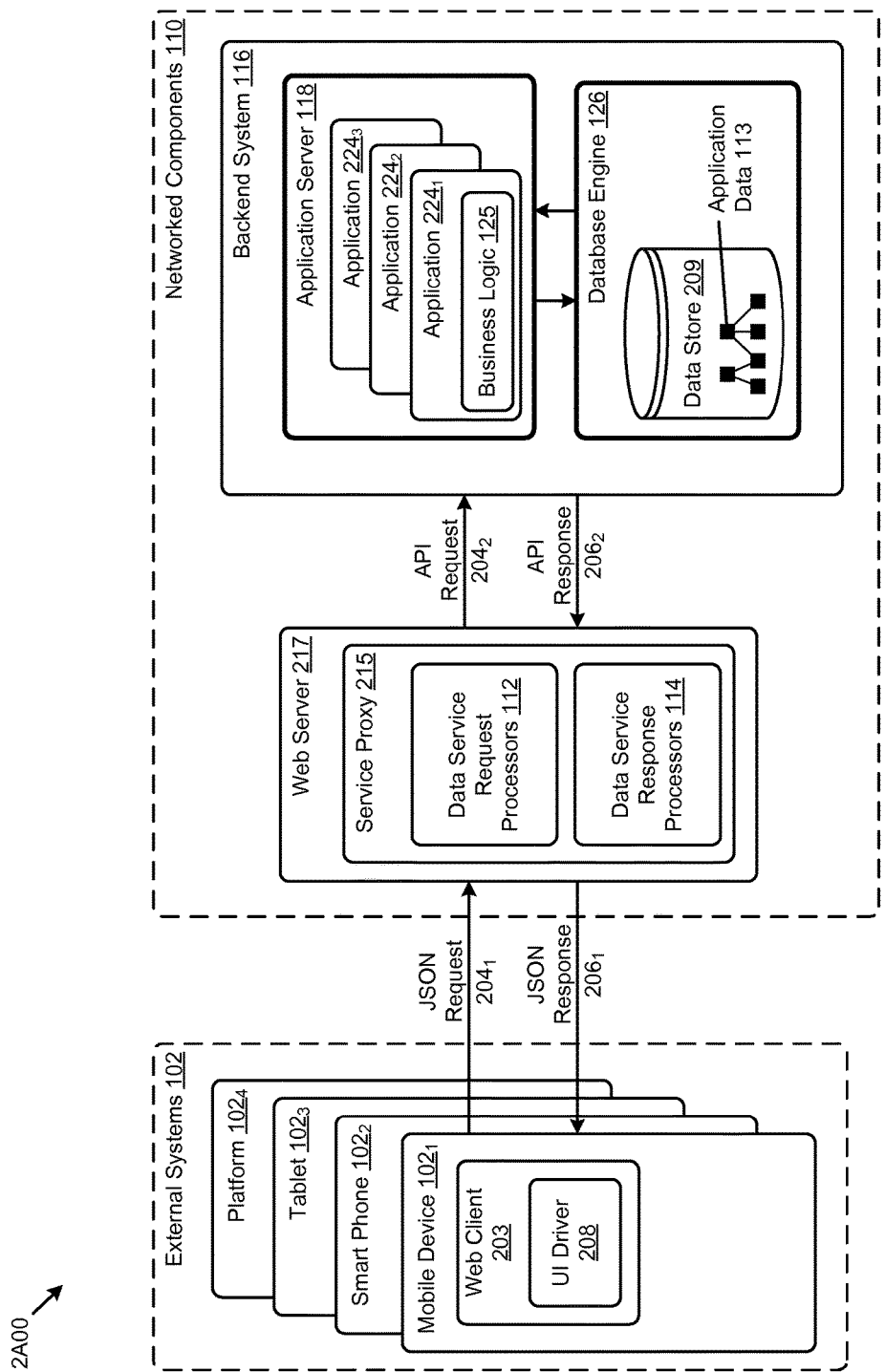
FIG. 2A presents an environment where a web client on an online mobile device communicates with backend application services, according to an embodiment.

FIG. 2A presents an environment 2A00 where a web client on an online mobile device communicates with backend application services. As an option, one or more instances of environment 2A00 or any aspect thereof may be implemented in the context of the architecture and functionality of the embodiments described herein. Also, environment 2A00 or any aspect thereof may be implemented in any desired environment.

Environment 2A00 depicts an example of a web client 203 (e.g., a "thin client") operating on various external systems 102 (e.g., a mobile device $102_1$, a smart phone $102_2$, a tablet $102_3$, a phablet, a platform $102_4$, etc.) and accessing (e.g., through a network connection) a plurality of applications 224 (e.g., enterprise applications) and a set of application data 113 provided by a set of networked components 110. Specifically, web client 203 on mobile device $102_1$ can communicate with a web server 217 using various requests (e.g., JSON request $204_1$) and responses (e.g., JSON response $206_1$). Web server 217 can host a service proxy 215 comprising any of a variety of data service request processors 112 and data service response processors 114. Requests from the external systems 102 can be processed by the data service request processors 112 and forwarded (e.g., see API request $204_2$) to a backend system 116 for additional processing. Responses from the backend system 116 (e.g., see API response $206_2$) can be processed by the data service response processors 114 and returned (e.g., see JSON response $206_1$) to the external systems 102. As shown, the data service request processors 112 and the data service response processors 114 can translate requests and responses, respectively, between various formats and protocols (e.g., JSON to app-specific API, etc.).

As further shown in FIG. 2A, web client 203 can comprise a UI driver 208. As an example, UI driver 208 can support a form-oriented user interface. Such forms comprise one or more fields, with each field conforming to strict semantics (e.g., data type, data size, etc.). UI driver 208 can further support a decoupling of the data presented in a form from the presentation (e.g., rendering) of such data in the user interface. Given these and other capabilities of UI driver 208, external systems 102 can send service requests in the form of JSON messages (e.g., JSON request $204_1$) to the service proxy 215. The service proxy 215 can also process responses to those service requests from backend system 116 and forward responses in the form of JSON messages (e.g., JSON response $206_1$) back to the external systems 102. In one or more embodiments, the JSON messages can be HTTP calls including one or more JSON data objects (e.g., attribute-value pairs, field-value pairs, etc.) and other directives (e.g., specifying backend system 116 operations, etc.). The foregoing exemplary format (e.g., JSON messages) is merely one example communicating requests and responses between external systems 102 and networked components 110. Reasonable formats have many variations (e.g., XML). For example, one or more embodiments can pass parameters into the plurality of applications 224 using interfaces (e.g., APIs) exposed by the plurality of applications 224. Other possibilities include formats to specify semantics of "create", "read", "update" and "delete" operations by backend system 116.

Figure 2B:
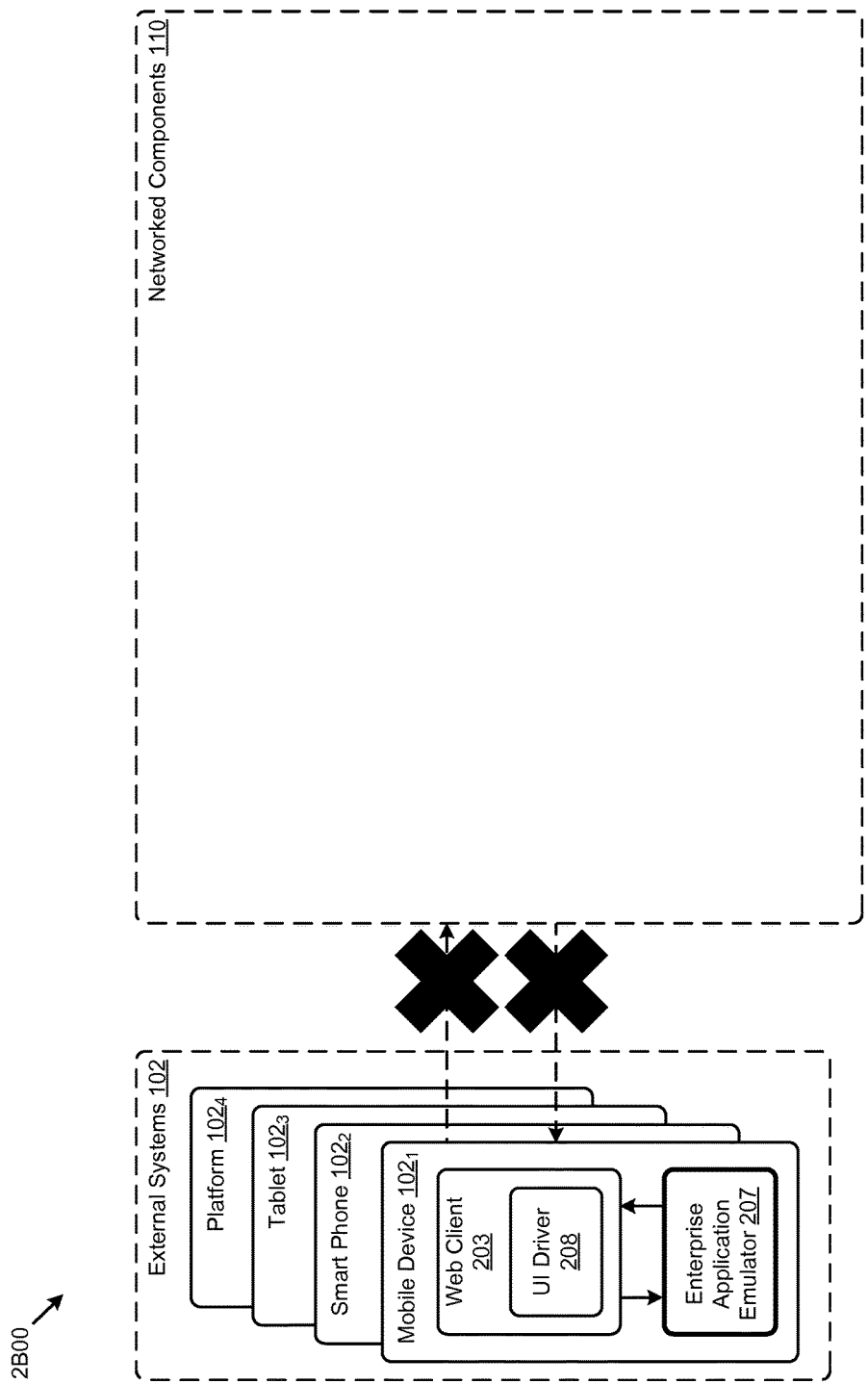
FIG. 2B presents an environment where a web client on an offline mobile device uses an emulator when disconnected from backend application services, according to an embodiment.

Referring again to environment 2A00, backend system 116 can comprise an application server 118 (e.g., a Java application server, JAS) to host the plurality of applications 224. Each instance of the plurality of applications 224 (e.g., application $224_1$, application $224_2$, application $224_3$) can execute a set of business logic 125 and other processes and operations that provide, in part, the functionality and capability of applications 224. Backend system 116 can further comprise a database engine 126 controlling access to a data store 209 which holds the application data 113 (e.g., relational data, flat data, raw data, metadata, etc.). In this case, as an example, a significant portion of both the functionality (e.g., business logic 125) and data (e.g., application data 113) for applications 224 can reside on networked components 110, given the limited capability of web client 203 when external systems 102 are disconnected from networked components 110. However, given the embodiment depicted in environment 2A00 (e.g., with UI driver 208 and JSON messaging, etc.), a networked components emulator able to merely emulate the request and response interactions can allow web client 203 to continue to operate when disconnected from the network. FIG. 2B depicts such a scenario.

Further details regarding a general approach to using JSON representations are described in U.S. application Ser. No. 14/179,548, entitled "RULE-BASED AUTOMATIC CLASS GENERATION FROM A JSON MESSAGES", filed Feb. 12, 2014, which is hereby incorporated by reference in its entirety.

FIG. 2B presents an environment 2B00 where a web client on an offline mobile device uses an emulator when disconnected from backend application services. As an option, one or more instances of environment 2B00 or any aspect thereof may be implemented in the context of the architecture and functionality of the embodiments described herein. Also, environment 2B00 or any aspect thereof may be implemented in any desired environment.

As shown in FIG. 2B, the external systems 102 have been disconnected from the networked components 110 (e.g., mobile device $102_1$ is offline). In this case, the web client 203 relies on an enterprise application emulator 207 to represent a portion of the function and data provided by the networked components 110. Specifically, in the embodiment of environment 2A00 and environment 2B00, enterprise application emulator 207 can capture a set of requests and responses (e.g., JSON request $204_1$ and JSON response $206_1$), and a set of relationships between the requests and responses, to emulate the operation of one or more instances of the plurality of applications 224 in networked components 110.

Figure 3A:
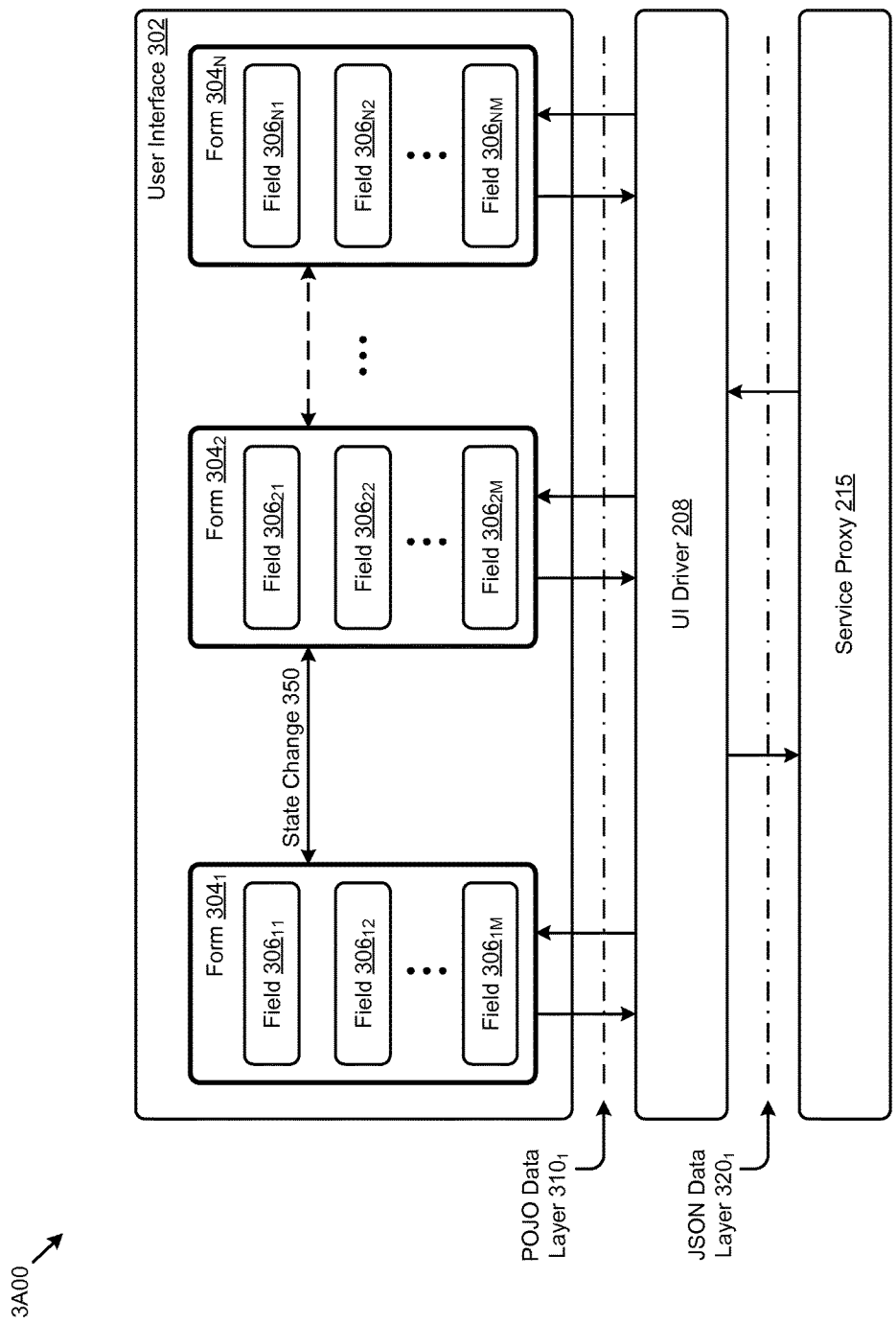
FIG. 3A is a diagram of a mobile web client form-oriented user interface and interaction with a backend service proxy, according to an embodiment.

FIG. 3A is a diagram 3A00 of a mobile web client form-oriented user interface and interaction with a backend service proxy. As an option, one or more instances of diagram 3A00 or any aspect thereof may be implemented in the context of the architecture and functionality of the embodiments described herein. Also, diagram 3A00 or any aspect thereof may be implemented in any desired environment.

An enterprise application (e.g., applications 224) can have an application user interface (e.g., user interface 302) that allows the user to interact with the application business logic (e.g., business logic 125) and data (e.g., application data 113) from the user's device (e.g., mobile device $102_1$). In many cases, the application user interface will include forms in the rendered view or page that the user sees. As the user navigates through the application user interface, the views and forms can change, as can the state of the application. More specifically, as shown in FIG. 3A, user interface 302 (e.g., for web client 203 on mobile device $102_1$) can comprise any number or variety of a plurality of forms 304 (e.g., form $304_1$, form $304_2$, form $304_N$, etc.) and a plurality of fields 306 (e.g., field $306_{11}$, field $306_{12}$, field $306_{22}$, field $306_{2M}$, etc.). The plurality of forms 304 and the plurality of fields 306 can present to the user the information necessary to perform various operations (e.g., create, read, update, delete, etc.) for the enterprise application. The plurality of forms 304 and the plurality of fields 306 can also enable a combination of operations. The data presented in each instance of the plurality of forms 304 can be driven and received by an interface driver (e.g., UI driver 208). As an example, UI driver 208 can interact with the plurality of forms 304 (e.g., render views or pages, receive form data, etc.) using Plain Old Java Objects (e.g., POJO) such that a POJO data layer $310_1$ exists between user interface 302 and UI driver 208. As indicated earlier, the UI driver 208 can further interact with the service proxy 215 (e.g., send requests, receive responses, etc.) using JavaScript Object Notation (e.g., JSON) such that a JSON data layer $320_1$ exists between UI driver 208 and service proxy 215. As the user interacts with the enterprise application through user interface 302, a state change 350 in the enterprise application (e.g., application $224_1$) and/or the user interface 302 (e.g., moving from form $304_1$ to form $304_2$) can occur. An example of the aforementioned interactions among components in diagram 3A00 is discussed as pertaining to FIG. 3B1 and FIG. 3B2.

FIG. 3B1 and FIG. 3B2 present a first use case 3B100 and a second use case 3B200, respectively, to illustrate emulation techniques used in systems for offline operation of an enterprise application. As an option, one or more instances of first use case 3B100 and second use case 3B200 or any aspect thereof may be implemented in the context of the architecture and functionality of the embodiments described herein. Also, first use case 3B100 and second use case 3B200 or any aspect thereof may be implemented in any desired environment.

As shown in first use case 3B100 of FIG. 3B1, a search form $304_3$ can be presented to an enterprise application user (e.g., by web client 203 on mobile device $102_1$) that allows the user to search for suppliers (e.g., see field label $307_{31}$) by entering a search term (e.g., "Sup*") in a field input $308_{31}$. Once the search term in entered, the user can click a "Submit" button (e.g., see form event control $309_{31}$) to send the input and operation data to UI driver 208 through a POJO data layer $310_2$. UI driver 208 can then translate the received data to a JSON request 321 for backend processing 316 (e.g., by networked components 110), effectively creating a JSON data layer $320_2$. In this case, JSON request 321 can be an HTTPS call comprising a host server URL (e.g., web server 217 at URL "webserver.com"), one or more instances of an action directive (e.g., "search"), one or more instances of an argument (e.g., "q=Sup*"), and other information. The action directive can further represent the state of the application (e.g., state "P04012") to, in part, direct the type of backend processing 316 to be performed. Backend processing 316 can access application business logic (e.g., business logic 125) and data (e.g., application data 113) to produce a formatted JSON response for delivery back to UI driver 208. The response back to UI driver 208 can be provided as a string. A formatted JSON response 322 is shown for readability. As shown, the attribute-value pair characteristic of JSON is evident in formatted JSON response 322. In this case, formatted JSON response 322 can comprise one or more instances of a response attribute (e.g., "state": "P04012"), and a set of multi-row data (e.g., "id" and "name" of each supplier in the search results). The JSON string comprising the formatted JSON response 322 is translated (e.g., bound to a POJO class) by the UI driver 208 to generate a results form $304_4$ showing the search results.

First use case 3B100 continues to second use case 3B200 at results form 304 of FIG. 3B2. In this case, the user can select one of the suppliers (e.g., "Supplier3") in the shown results form $304_4$ to drill down into the details of the selected supplier. When the supplier is selected by the user, the input and operation data are received by UI driver 208 through a POJO data layer $310_2$. UI driver 208 can then translate the received data to a JSON request 323 for backend processing 316 (e.g., by networked components 110), effectively creating a JSON data layer $320_2$. In this case, JSON request 323 can be an HTTPS call comprising a host server URL (e.g., web server 217 at URL "webserver.com"), one or more instances of an action directive (e.g., "details"), one or more instances of an argument (e.g., "id=1003"), and other information. The action directive can further represent the state of the application (e.g., state "P01012") to, in part, direct the type of backend processing 316 to be performed. Backend processing 316 can access application business logic (e.g., business logic 125) and data (e.g., application data 113) to produce a formatted JSON response 324 for delivery back to UI driver 208. The response back to UI driver 208 can be provided as a string. As shown, the attribute-value pair characteristic of JSON is evident in formatted JSON response. In this case, formatted JSON response 324 can comprise one or more instances of a response attribute (e.g., "state": "P01012"), and a set of single-row data (e.g., contact information of Supplier3). The JSON string comprising the formatted JSON response 324 is translated (e.g., bound to a POJO class) by the UI driver 208 to generate a details form $304_5$ showing the supplier details. The item that binds the navigation from results form $304_4$ to details form $304_5$ is the supplier ID (e.g., "1003"). One technique for enabling the user interaction described in first use case 3B100 and second use case 3B200 when the user is offline (e.g., no backend processing 316) is discussed as pertaining to FIG. 4A through FIG. 4C.

Figure 4A:
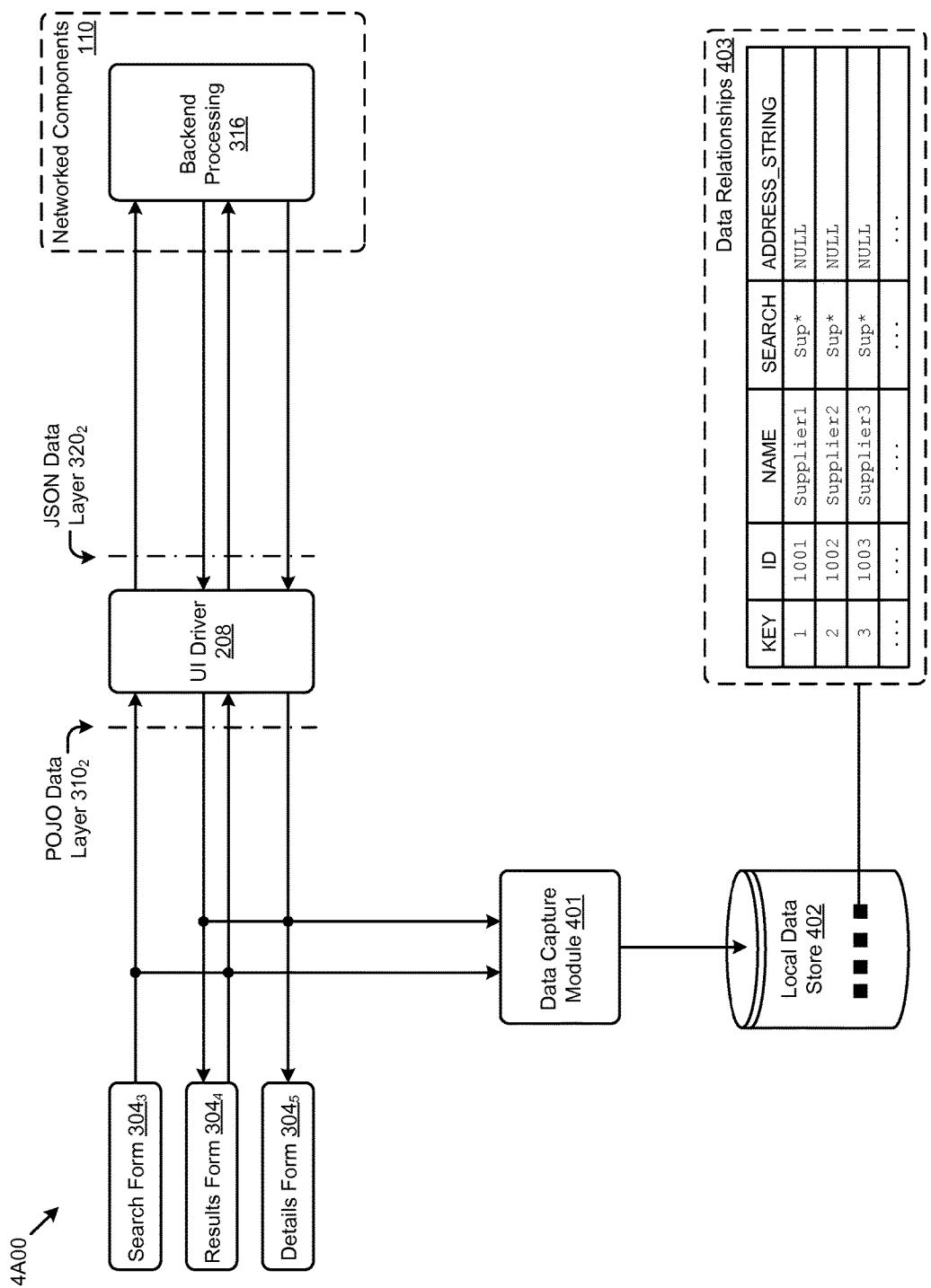
FIG. 4A, FIG. 4B, and FIG. 4C present block diagrams of a system for recreating data relationships in a local database for emulating online behavior while offline, according to an embodiment.
Figure 4B:
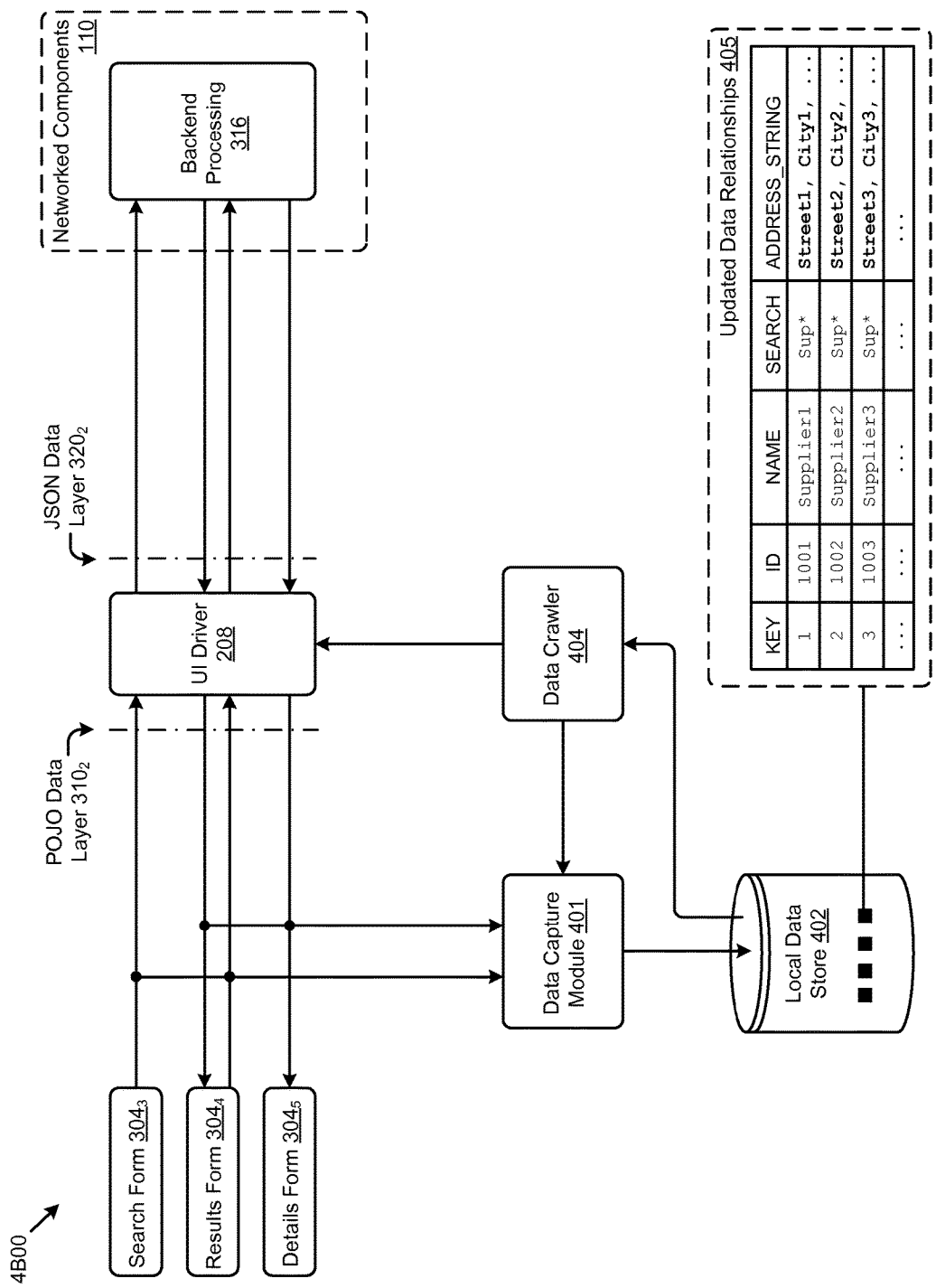
Figure 4C:
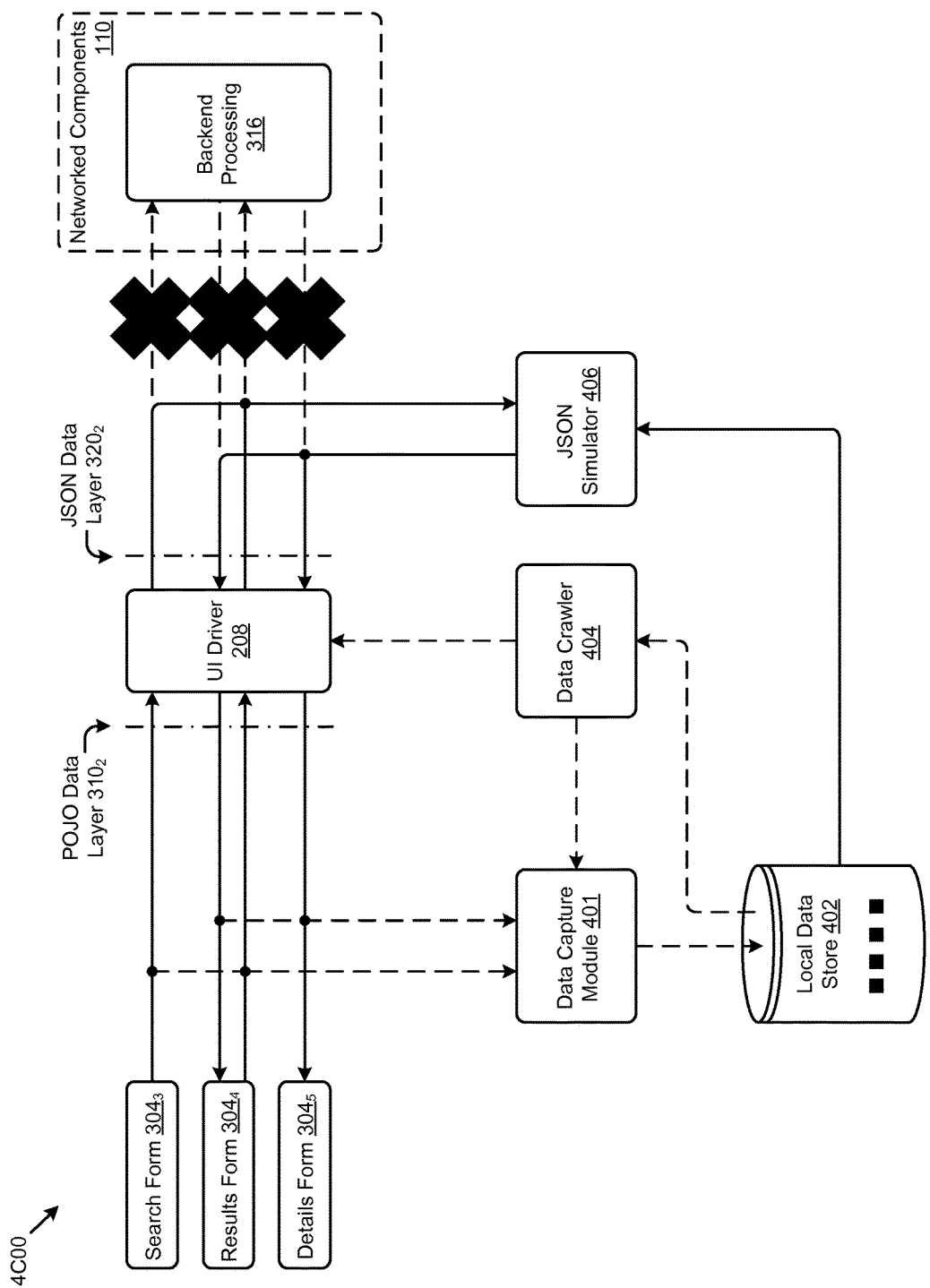

FIG. 4A, FIG. 4B, and FIG. 4C present a block diagram 4A00, a block diagram 4B00, and a block diagram 4C00, respectively, of a system for recreating data relationships in a local database for emulating online behavior while offline. As an option, one or more instances of block diagram 4A00, block diagram 4B00, and block diagram 4C00, or any aspect thereof may be implemented in the context of the architecture and functionality of the embodiments described herein. Also, block diagram 4A00, block diagram 4B00, and block diagram 4C00, or any aspect thereof may be implemented in any desired environment.

Block diagram 4A00 depicts the flow from a search form $304_3$ to a results form $304_4$ and on to a details form $304_5$ as described in first use case 3B100 and in second use case 3B200. Specifically, UI driver 208 interacts with the plurality of forms 304 through POJO data layer $310_2$, and communicates (e.g., sends requests, receives responses, etc.) with the networked components 110 through JSON data layer $320_2$. Backend processing 316 is performed by one or more processing entities in networked components 110. Block diagram 4A00 further comprises a data capture module 401 and a local data store 402. In one or more embodiments, the data capture module 401 can capture a portion of the data comprising the interaction between UI driver 208 and the plurality of forms 304 (e.g., through user activity) and store the portion of data in local data store 402. As an example, a set of data relationships 403 can be captured and stored when traversing between search form $304_3$ and results form $304_4$ in first use case 3B100. Data relationships 403 can comprise one-to-one or one-to-many, or many-to-one relationships stored in a data table having rows. As shown, the data relationships 403 can codify a correspondence between the list of suppliers returned to the search query of the hereinabove-discussed use case. More specifically, each row in the table has an auto-incremented KEY field (e.g., 1, 2, etc.), a supplier ID field (e.g., "1001", "1002", etc.), a supplier NAME field (e.g., "Supplier1", "Supplier2", etc.), a SEARCH term field (e.g., "Sup*"), and an ADDRESS_STRING field (e.g., NULL). The ADDRESS_STRING is null in this instance since that particular data has not been delivered by networked components 110 such that it is can be presented for capture by data capture module 401.

As shown in block diagram 4B00 of FIG. 4B, a data crawler 404 can also be used to build out data relationships 403 while access to networked components 110 is available. For example, data crawler 404 can be used to populate the ADDRESS_STRING field in data relationships 403 by iterating through each supplier in data relationships 403 and simulating a request to UI driver 208 for supplier details as described in second use case 3B200. The supplier details for each supplier returned from networked components 110 can then be captured by data capture module 401 and stored in local data store 402 as a set of updated data relationships 405. As shown, updated data relationships 405 now has data in the ADDRESS_STRING fields. In one or more embodiments, data crawler 404 can be run as a background process with no interruption to the use of the enterprise application by the user. As an alternative to data captured by data crawler 404, only some portion of the details for each supplier selected by the user can be captured and updated in updated data relationships 405.

When networked components 110 are disconnected as shown in FIG. 4C, a JSON simulator 406 can be used to allow the user to continue to perform various enterprise application operations. Specifically, JSON simulator 406 can accept requests from UI driver 208 and "simulate" JSON responses by re-instantiating the JSON-specific user interface POJOs based on the relational data (e.g., updated data relationships 405) in local data store 402. This approach has several limitations. For example, when moving over multiple pages (e.g., forms) and multiple result sets, the code comprising data capture module 401, data crawler 404, and JSON simulator 406 can get extremely complex and voluminous. More specifically, large and complex sets of code are required for handling transitions between online-offline modes. Further, a substantial amount of local storage (e.g., local data store 402) is required to effectively "recreate" the application data (e.g., application data 113) for offline use. Also, a significant amount of processing overhead is required for re-instantiation of POJOs during offline simulation. This approach can also often demand long and complex test suites in order to achieve sufficient coverage of the numerous possible use cases and scenarios. Further, multiple levels of detail or a finer granularity at a particular level of detail will tend to increase code complexity.

To overcome such issues associated with the approach discussed as pertaining to FIG. 4A and FIG. 4B, the herein-disclosed techniques capture JSON messages and their relationships rather than capturing the underlying application data and their relationships. More specifically, the herein-disclosed techniques enable building and storing of JSON message relationships for offline operation of an enterprise application. One embodiment of the herein-disclosed techniques as used to enable the user interaction described in first use case 3B100 and second use case 3B200 when the user is offline (e.g., no backend processing 316) is discussed as pertaining to FIG. 5A through FIG. 5C.

Figure 5A:
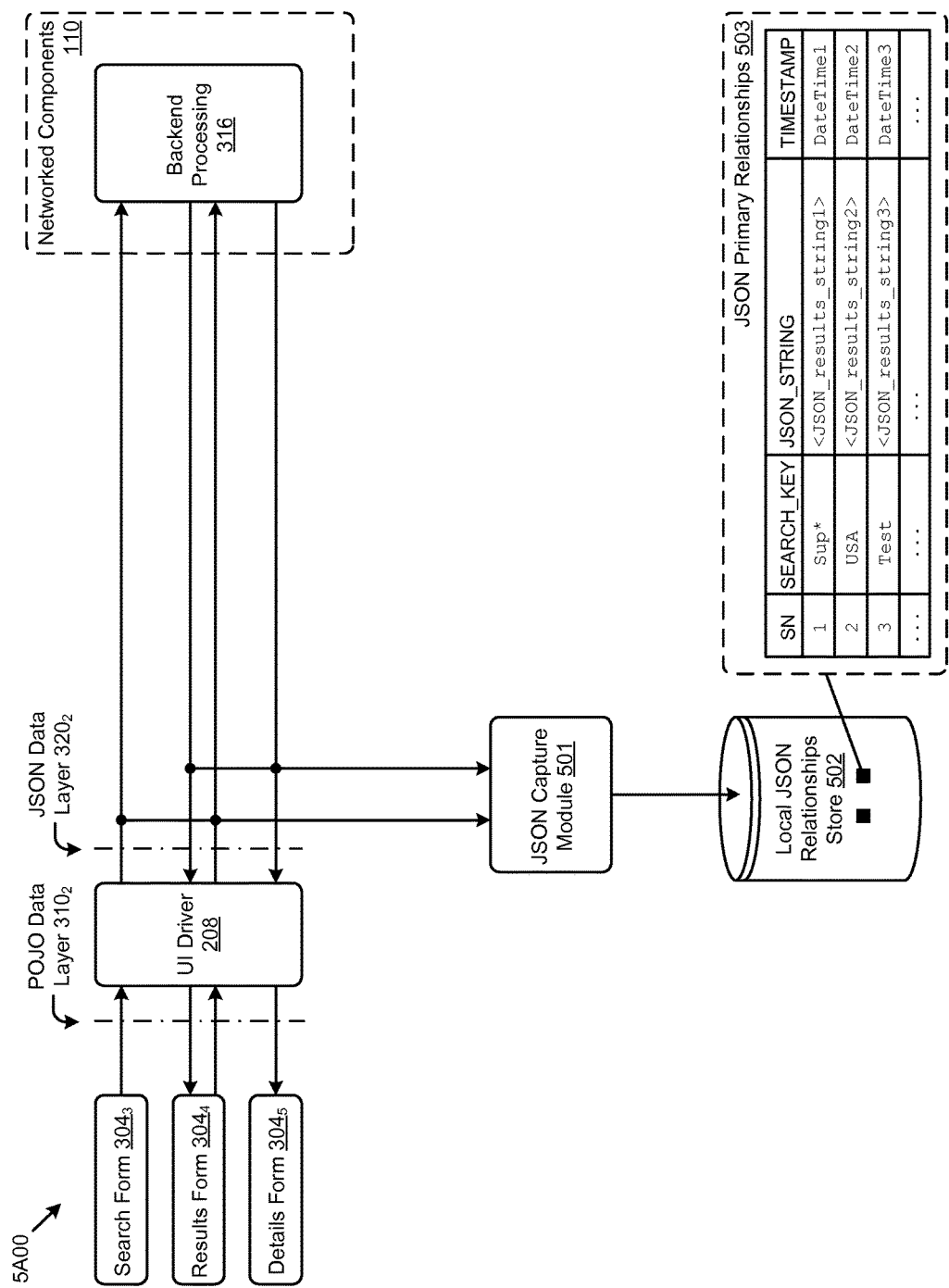
FIG. 5A, FIG. 5B, and FIG. 5C present block diagrams of a system for building and storing of JSON message relationships for offline operation of an enterprise application, according to some embodiments.
Figure 5B:
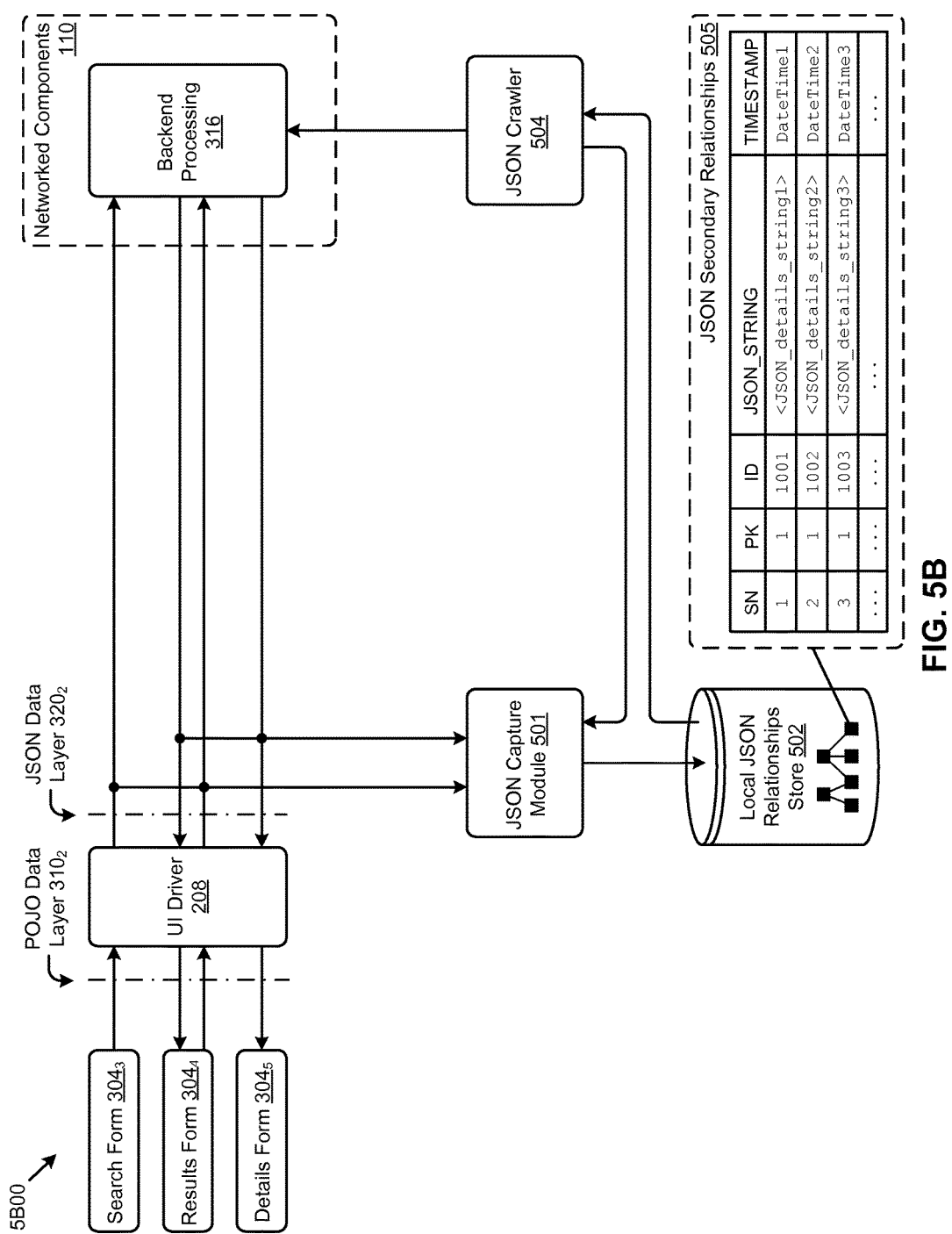
Figure 5C:
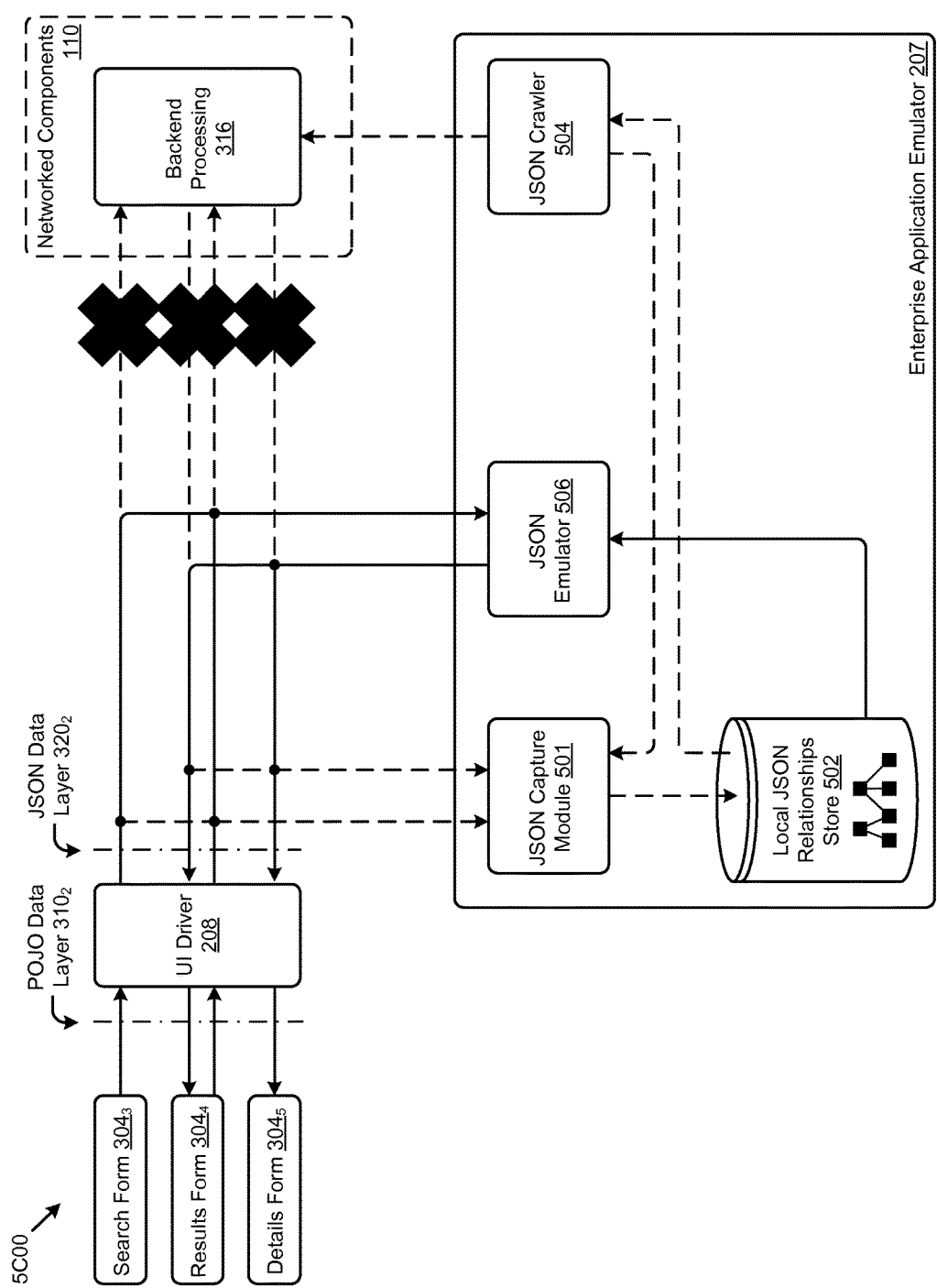

FIG. 5A, FIG. 5B, and FIG. 5C present a block diagram 5A00, a block diagram 5B00, and a block diagram 5C00, respectively, of a system for building and storing of JSON message relationships for offline operation of an enterprise application. As an option, one or more instances of block diagram 5A00, block diagram 5B00, and block diagram 5C00, or any aspect thereof may be implemented in the context of the architecture and functionality of the embodiments described herein. Also, block diagram 5A00, block diagram 5B00, and block diagram 5C00, or any aspect thereof may be implemented in any desired environment.

Block diagram 5A00 depicts the flow from search form $304_3$ to a results form $304_4$ and on to a details form $304_5$ as described in first use case 3B100 and second use case 3B200. Specifically, UI driver 208 interacts with the plurality of forms 304 through POJO data layer $310_2$, and communicates (e.g., sends requests, receives responses, etc.) with the networked components 110 through JSON data layer $320_2$. Backend processing 316 is performed by one or more processing entities in networked components 110. Block diagram 5A00 further comprises a JSON capture module 501 and a local JSON relationships store 502. In one or more embodiments, JSON capture module 501 can capture a portion of the JSON messages (e.g., requests, responses, etc.) between UI driver 208 and the networked components 110 occurring as a result of online user activity. The captured JSON messages and their relationships can then be stored in a local JSON relationships store 502. As an example, a set of JSON primary relationships 503 can be captured and stored when traversing between search form $304_3$ and results form $304_4$ in first use case 3B100 and other search use cases. Specifically, JSON primary relationships 503 comprises a data table having rows corresponding to the JSON responses returned by various search queries. Other tables can be instantiated based on a number of levels of detail and relationships defined between them and driven by the user interface flow. More specifically, each row in the table has an auto-incremented SN field (e.g., 1, 2, etc.), a SEARCH_KEY field (e.g., "Sup*", "USA", etc.), a JSON_STRING field (e.g., <JSON_results_string1>, <JSON_results_string2>, etc.), and a TIMESTAMP field (e.g., DateTime1, DateTime2, etc.). The first row (e.g., SN=1) corresponds to first use case 3B100 (e.g., SEARCH_KEY="Sup*") such that <JSON_results_string1> represents the information (e.g., in string format) in formatted JSON response 322. All of the strings in JSON_STRING are the same JSON string response returned when the application ran online for the corresponding search query. The JSON strings stored in JSON primary relationships 503 can be instantly converted to the original POJO (e.g., by calling a helper class). The data in the TIMESTAMP column provides an indicator of the freshness of the JSON strings. The information in JSON primary relationships 503 is sufficient to re-instantiate all the related POJO classes that the JSON drives (e.g., when the user is online) and renders to the user interface. The user will basically be looking back in time when the application is offline (e.g., networked components 110 are disconnected), and see the same search results the user originally saw from previous searches. In one or more embodiments, the approach described is applicable when user input is required to fetch a result set, as compared to the result set being prefetched and rendered for the user without the need for a search key. The request-response patterns can be captured by JSON capture module 501 over any number of patterns, and each pattern can be captured including, but not limited to, (1) the entirety of the request and response, (2) the relationship between the request and response, and (3) the relationship between a second request and a first request, and so on. The range of possibilities for request and response relationships grows with respect to the extent of the user interface. For example, a user interface comprised of a form with just one field is likely to have fewer possible request-response pairs and relationships than would a form with tens or hundreds of fields.

As shown in block diagram 5B00 of FIG. 5B, a JSON crawler 504 can also be used to build more sets of JSON relationships while access to networked components 110 is available. In one or more embodiments, JSON crawler 504 can mock the behavior of a user (e.g., common paths and transitions between pages and states) in order to produce a wide range of request-response pairs, including request-response pairs that depend from one or more previous request-response pairs. For example, JSON crawler 504 can be used to generate JSON relationships corresponding to the request of supplier details as described in second use case 3B200. For example, JSON crawler 504 can iterate through all the supplier IDs included in <JSON_results_string1> in JSON primary relationships 503 and simulate a JSON request to networked components 110 for supplier details as described in second use case 3B200. The JSON response associated with the supplier details for each supplier returned from networked components 110 can then be captured by JSON capture module 501 and stored in local JSON relationships store 502 as a set of JSON secondary relationships 505. As shown, JSON secondary relationships 505 comprises an auto-incremented SN field (e.g., 1, 2, etc.), a PK primary key field (e.g., 1), an ID field (e.g., "1001", "1002", etc.), a JSON_STRING field (e.g., <JSON_details_string1>, <JSON_details_string2>, etc.), and a TIMESTAMP field (e.g., DateTime1, DateTime2, etc.). As indicated by the PK column, all rows shown are related to the parent SN of "1" in JSON primary relationships 503 (e.g., search results for "Sup*"). This relationship indicates a dependency between the one application state (e.g., search results in results form $304_4$) and another application state (e.g., supplier details in details form $304_5$). Each row of JSON secondary relationships 505 then corresponds to the details response provided for each supplier (e.g., "1001", "1002", etc.) included in <JSON_results_string1>. More specifically, the third row (e.g., ID="1003") of JSON secondary relationships 505 corresponds to second use case 3B200 (e.g., Supplier3 details) such that <JSON_details_string3> represents the information (e.g., in string format) in formatted JSON response 324. All of the strings in JSON_STRING are the same JSON string response returned when the application ran online for the corresponding details request. In one or more embodiments, JSON crawler 504 can be run as a background process with no interruption to the use of the enterprise application by the user. As an alternative to the JSON relationships captured by JSON crawler 504, only the JSON strings corresponding to the details for each supplier selected by the user can be captured and updated in JSON secondary relationships 505.

When networked components 110 are disconnected as shown in FIG. 5C, a JSON emulator 506 can be used to allow the user to continue to perform various enterprise application operations. Specifically, JSON emulator 506 can accept requests from UI driver 208 and generate the same JSON responses as would have been provided by the networked components 110 based on the relational JSON information (e.g., JSON primary relationships 503, JSON secondary relationships 505, etc.) in local JSON relationships store 502. Specifically, the stored JSON strings and their relationships can be used to re-instantiate the POJO classes to drive the user interface (e.g., at UI driver 208), giving the user a seamless transition between online and offline modes. In one or more embodiments, an enterprise application emulator 207 comprising JSON capture module 501, local JSON relationships store 502, JSON crawler 504, and JSON emulator 506, can be deployed to, and implemented on, various client devices (e.g., mobile device $202_1$).

Improved techniques are disclosed hereunder. Specifically, the JSON capture technique obviates the need to design and build a local application-specific relational data model, and instead enables more generic local data models with simple relationship definitions. JSON capture also enables the re-instantiation of POJO classes that drive the user interface to be performed by simple converter methods. Such techniques further circumvent the need to convert relational data to JSON-specific POJOs for writes and reads. In exemplary cases, the POJO classes used in the operation of the application in online mode can be relationally stored, instead of the underlying data. A data level relationship definition between the POJOs is stored, however in exemplary embodiments, none of the attributes contained in the POJO need to be stored relationally.

Figure 6:
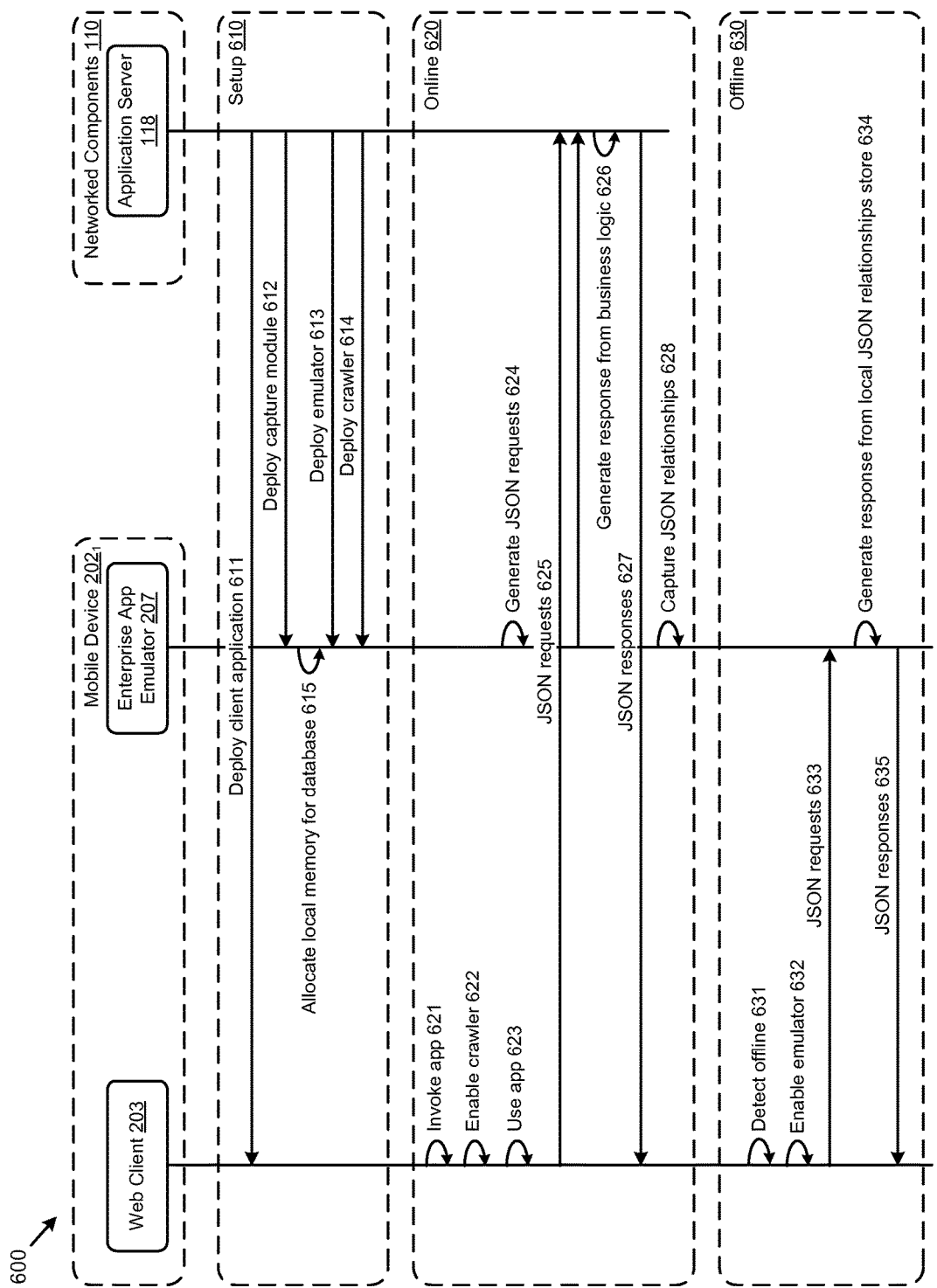
FIG. 6 presents a protocol for deploying and operating an application using JSON message relationships for emulating online operation of an enterprise application while offline, according to an embodiment.

FIG. 6 presents a protocol 600 for deploying and operating an application using JSON message relationships for emulating online operation of an enterprise application while offline. As an option, one or more instances of protocol 600 or any aspect thereof may be implemented in the context of the architecture and functionality of the embodiments described herein. Also, protocol 600 or any aspect thereof may be implemented in any desired environment.

Protocol 600 depicts operations and communications on and between a web client 203 and an enterprise application emulator operating on mobile device $202_1$, and/or between application server 118 operated by one or more networked components 110. Protocol 600 further comprises a portion of a setup protocol (see setup 610) to prepare web client 203, enterprise application emulator 207, and application server 118 to interact with each other to perform additional operations. Specifically, protocol 600 also depicts a portion of a protocol while mobile device $202_1$ is online (see online 620), and a portion of a protocol while mobile device $202_1$ is offline (see offline 630).

Referring to setup 610, application server 118 can first deploy a client application (see operation 611) to be instantiated as web client 203. Application server 118 can also deploy a JSON capture module (see operation 612), a JSON emulator (see operation 613), and a JSON crawler (see operation 614) to be instantiated together as enterprise application emulator 207. The deploying of the JSON capture module can also require an allocation of memory (e.g., for a local database) on the mobile device $202_1$ to support operation of the enterprise application emulator 207 (see operation 615). Referring to online 620, web client 203 can invoke the application (see operation 621) and enable the crawler (see operation 622). A user can then start to use the application (see operation 623) which in turn generates JSON requests for application server 118 (see message 625). The crawler on enterprise application emulator 207 can also generate JSON requests (see operation 624) to simulate user activity and behavior. Application server 118 will then generate a set of responses using, in part, its business logic (see operation 626) and deliver the corresponding JSON responses to web client 203 (see message 627). Enterprise application emulator 207 can capture some or all of the JSON messages and their relationships (see operation 628) for use as protocol 600 transitions from online 620 to offline 630. Referring to offline 630, web client 203 can detect that mobile device $202_1$ is offline (see operation 631) and enable enterprise application emulator 207 (see operation 632). Now, when user activity generates JSON requests (see message 633), enterprise application emulator 207 will receive those requests and generate responses from the local JSON relationship store (see operation 634). The JSON messages captured from the application server 118 when online and stored locally can be used to provide the JSON responses (see message 635) to the web client 203 for uninterrupted offline application use.

Additional Embodiments of the Disclosure

Additional Practical Application Examples

Figure 7:
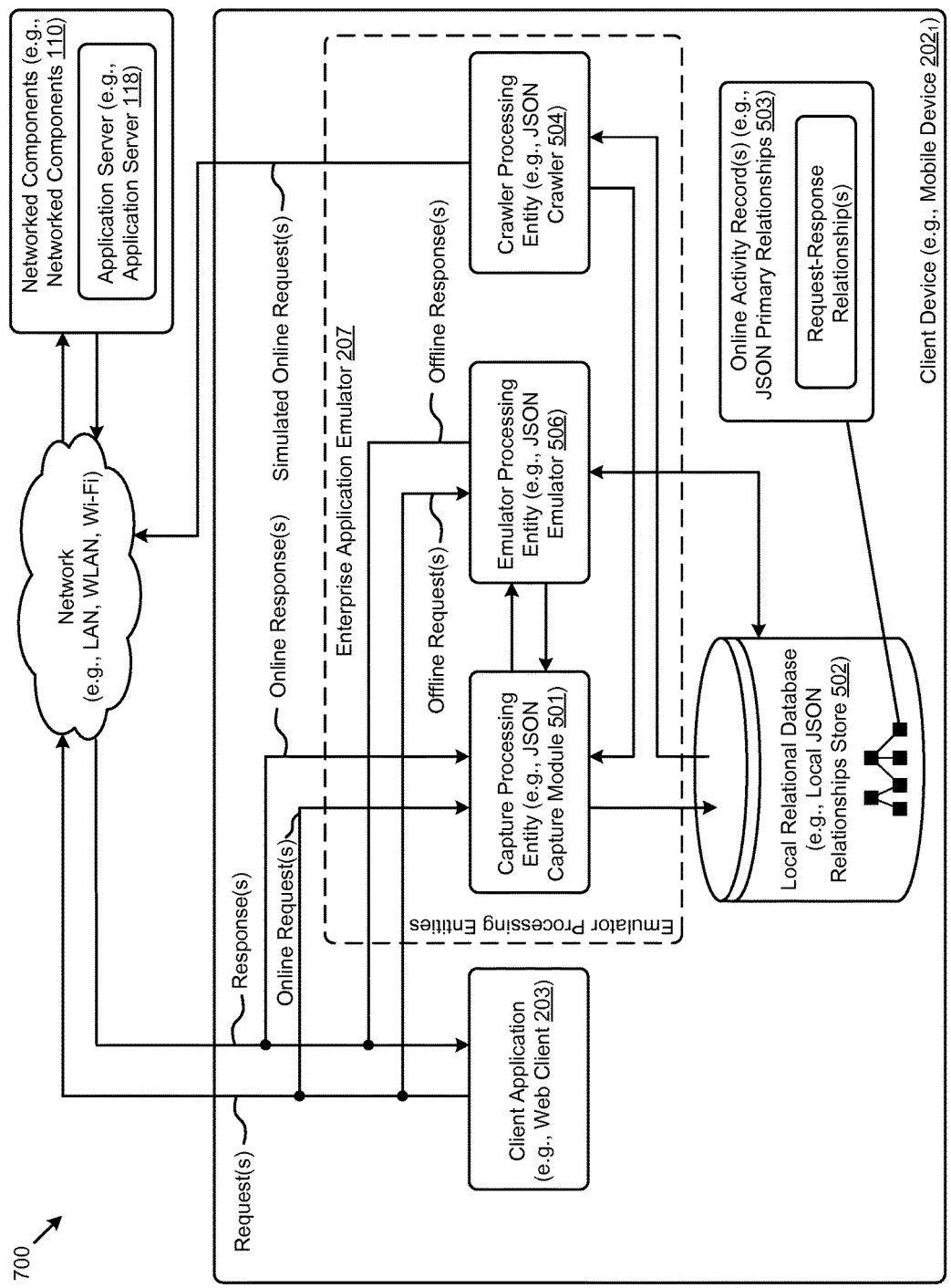
FIG. 7 depicts a system as an arrangement of computing modules that are interconnected so as to operate cooperatively to implement any of the herein-disclosed embodiments.

FIG. 7 depicts a system 700 as an arrangement of computing modules that are interconnected so as to operate cooperatively to implement any of the herein-disclosed embodiments. The partitioning of system 700 is merely illustrative and other partitions are possible.

As shown, system 700 comprises client device (e.g., mobile device $202_1$) connected by a network to a set of networked components (e.g., networked components 110) that include an application server (e.g., application server 118). The client device can operate a client application (e.g., web client 203) that sends requests to the application server and receives responses from the application server. System 700 further comprises a local database (e.g., local JSON relationships store 502) on the client device, which can store a series of records for access by other processing entities in system 700. System 700 further comprises a capture processing entity (e.g., JSON capture module 501) on the client device that stores, in the local database, online activity records (e.g., JSON primary relationships 503), which describe the relationships between online requests from the client application and online responses from the application server executed when the client device is connected to the application server over the network. System 700 further comprises an emulator processing entity (e.g., JSON emulator 506) on the client device to receive offline requests from the client application and deliver offline responses to the client application when the client device is disconnected from the application server, wherein the offline responses are based in part on the offline requests and the online activity records stored in the local database. In one or more embodiments, system 700 can further comprise a crawler processing entity (e.g., JSON crawler 504) on the client device that generates a set of simulated online requests and executes the simulated online requests when the client device is connected to the application server over the network. Such simulated online requests generate additional online activity records for storage in the local database by the capture processing entity for use by the emulator processing entity when the client device is disconnected from the application server.

Figure 8A:
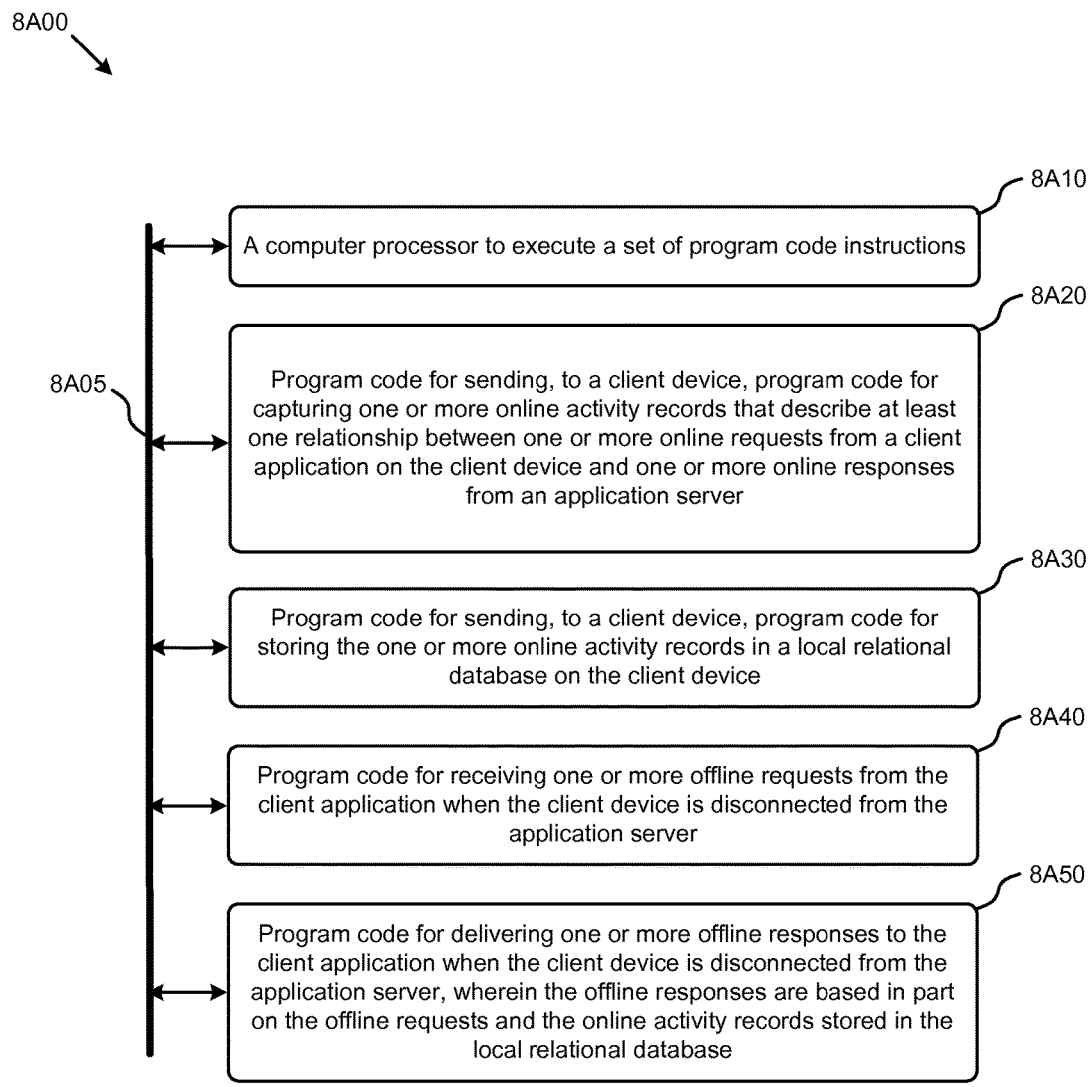
FIG. 8A depicts a system as an arrangement of computing modules that are interconnected so as to operate cooperatively to implement any of the herein-disclosed embodiments.

FIG. 8A depicts a system 8A00 as an arrangement of computing modules that are interconnected so as to operate cooperatively to implement any of the herein-disclosed embodiments. The computing can comprise one or more processing entities operated by one or more processors. The partitioning of 8A00 is merely illustrative and other partitions are possible. As shown, the modules are connected to a communication path 8A05, and any module can communicate with other modules over communication path 8A05. The modules of the system can, individually or in combination, perform operations within system 8A00. Any operations performed within system 8A00 may be performed in any order unless as may be specified in the claims.

More specifically, system 8A00 can comprise at least one computing module to execute a set of program code instructions (see module 8A10) and modules for accessing memory to hold program code instructions to send, to a client device, program code for capturing one or more online activity records that describe at least one relationship between one or more online requests from a client application on the client device and one or more online responses from an application server. The aforementioned program code for capturing one or more online activity records is executed when the client device is connected to the application server over a network (see module 8A20. The shown system further comprises program code for: storing the one or more online activity records in a local database on the client device (see module 8A30); receiving one or more offline requests from the client application when the client device is disconnected from the application server (see module 8A40); and delivering one or more offline responses to the client application when the client device is disconnected from the application server, wherein the offline responses are based in part on the offline requests and the online activity records stored in the local database (see module 8A50).

Figure 8B:
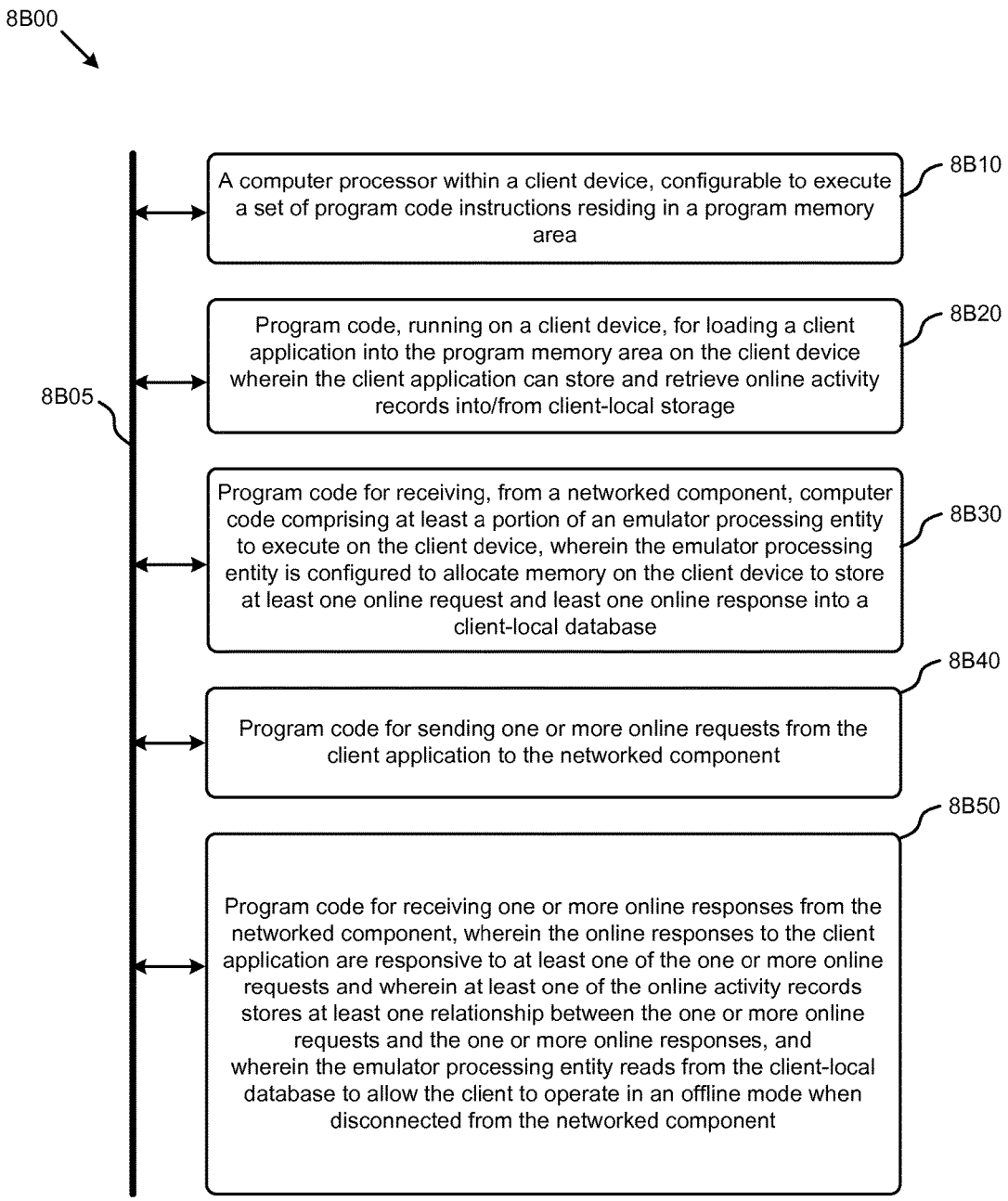
FIG. 8B depicts a system as an arrangement of computing modules that are interconnected so as to operate cooperatively to implement any of the herein-disclosed embodiments.

FIG. 8B depicts a system 8B00 as an arrangement of computing modules that are interconnected so as to operate cooperatively to implement any of the herein-disclosed embodiments. As shown, the modules are connected to a communication path 8B05, and any module can communicate with other modules over communication path 8B05. More specifically, system 8B00 can comprise at least one computing module to execute a set of program code instructions (see module 8B 10) and modules for accessing memory to hold program code instructions to perform: loading a client application onto a client device wherein the client application accesses a client-local database of online activity records (see module 8B20); receiving, from a networked component, computer code comprising at least a portion of an emulator processing entity to execute on the client device, wherein the emulator processing entity is configured to allocate memory on the client device to store at least one online request and least one online response into a client-local database (see module 8B30); sending one or more online requests from the client application to the networked component (see module 8B40); and receiving one or more online responses from the networked component, wherein the online responses to the client application are responsive to at least one of the one or more online requests, and wherein at least one of the online activity records stores at least one relationship between the one or more online requests and the one or more online responses, and wherein the emulator processing entity reads from the client-local database to allow the client to operate in an offline mode when disconnected from the networked component (see module 8B50).

Methods can be practiced in any environment, such as given in the following embodiments:

Embodiment 1

A method for offline operation of a client application on a client device using a client-local database of online activity records, the method comprising: sending computer code comprising at least a portion of an emulator processing entity to the client device, the emulator processing entity configured to allocate memory on the client device to store at least one online request and one or more online responses into a client-local database; receiving one or more online requests from the client application; and delivering the one or more online responses to the client application, such that (a) the online responses to the client application are responsive to at least one of the one or more online requests, (b) at least one of the online activity records stores at least one relationship between the one or more online requests and the one or more online responses, and (c) the emulator processing entity configured to read from the client-local database to allow the client to operate in an offline mode when disconnected from a network.

Embodiment 2

The method of embodiment 1, wherein the emulator processing entity stores at least one relationship between at least one of the one or more online requests and at least one of the one or more online responses.

Embodiment 3

The method of embodiment 1, wherein the emulator processing entity is configured to be operated by one or more processors on the client device.

Embodiment 4

The method of embodiment 3, wherein the emulator processing entity is configured to process one or more offline requests when the client device is disconnected from a network.

Embodiment 5

The method of embodiment 4, wherein the emulator processing entity is configured to deliver one or more offline responses to the client application when the client device is disconnected from an application server.

Embodiment 6

The method of embodiment 5, wherein the offline responses are based at least in part on the offline requests and the online activity records are stored in the client-local database.

Embodiment 7

The method of embodiment 1, wherein one or more online requests and one or more offline responses has a JSON format.

Embodiment 8

The method of embodiment 1, further comprising deploying a crawler processing entity to the client device, wherein the crawler processing entity is configured to generate a set of simulated online requests when the client device is connected to an application server.

Embodiment 9

The method of embodiment 8, further comprising generating simulated online requests when the client device is connected to an application server over a network.

Embodiment 10

The method of embodiment 9, wherein the simulated online requests generate additional online activity records for storage in the client-local database to be accessible when the client device is disconnected from the application server.

System Architecture Overview
Additional System Architecture Examples

Figure 9A:
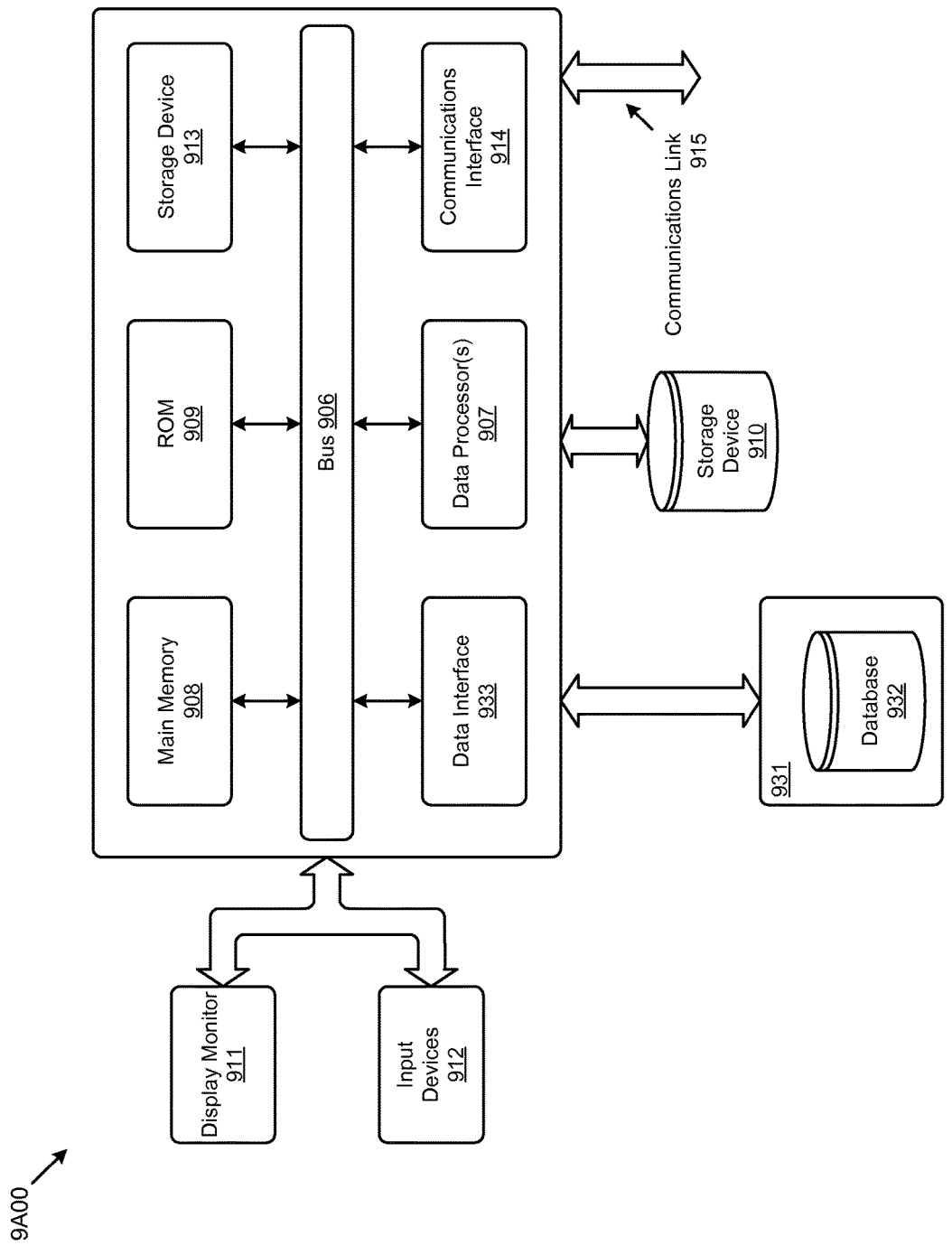
FIG. 9A, FIG. 9B, and FIG. 9C depict exemplary architectures of components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information, which interconnects subsystems and devices such as a processor 907, a system memory (e.g., main memory 908, or an area of random access memory RAM), a static storage device (e.g., ROM 909), a storage device (e.g., magnetic or optical) such as storage device 913, a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory. Such instructions may be read into system memory from another computer readable/usable medium such as a static storage device or a disk drive. Such sequences can be organized to be accessed by one or more processing entities configured to execute a single process or configured to execute multiple concurrent processes to perform work. A processing entity can be hardware-based (e.g., involving one or more cores) or software-based or can be formed of a combination of hardware and software and can carry out computations or processing steps implemented using one or more processes, and/or one or more tasks and/or one or more threads or any combination therefrom.

In some embodiments, hard-wired circuitry may be used in place of or in combination with software instructions to implement aspects of the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms including, but not limited to, non-volatile media and volatile media (e.g., storage device 910). Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to certain embodiments of the disclosure, two or more instances of computer system 900 coupled by a communications link 915 (e.g., LAN, PTSN, or wireless network) may perform the sequence of instructions required to practice the disclosure in coordination with one another.

The computer system 900 may transmit and receive messages, data, and instructions including programs (e.g., application code), through communications link 915 and communication interface 914. Received program code may be executed by processor 907 as it is received and/or stored in the shown storage device or in or upon any other non-volatile storage for later execution. Computer system 900 may communicate through a data interface 933 to a database 932 on an external data repository 931. Data items in a database can be accessed using a primary key (e.g., a relational database primary key). A module as used herein can be implemented using any mix of any portions of the system memory and any extent of hard-wired circuitry including hard-wired circuitry embodied as a processor 907. Some embodiments include one or more special-purpose hardware components (e.g., power control, logic, sensors, etc.).

Figure 9B:
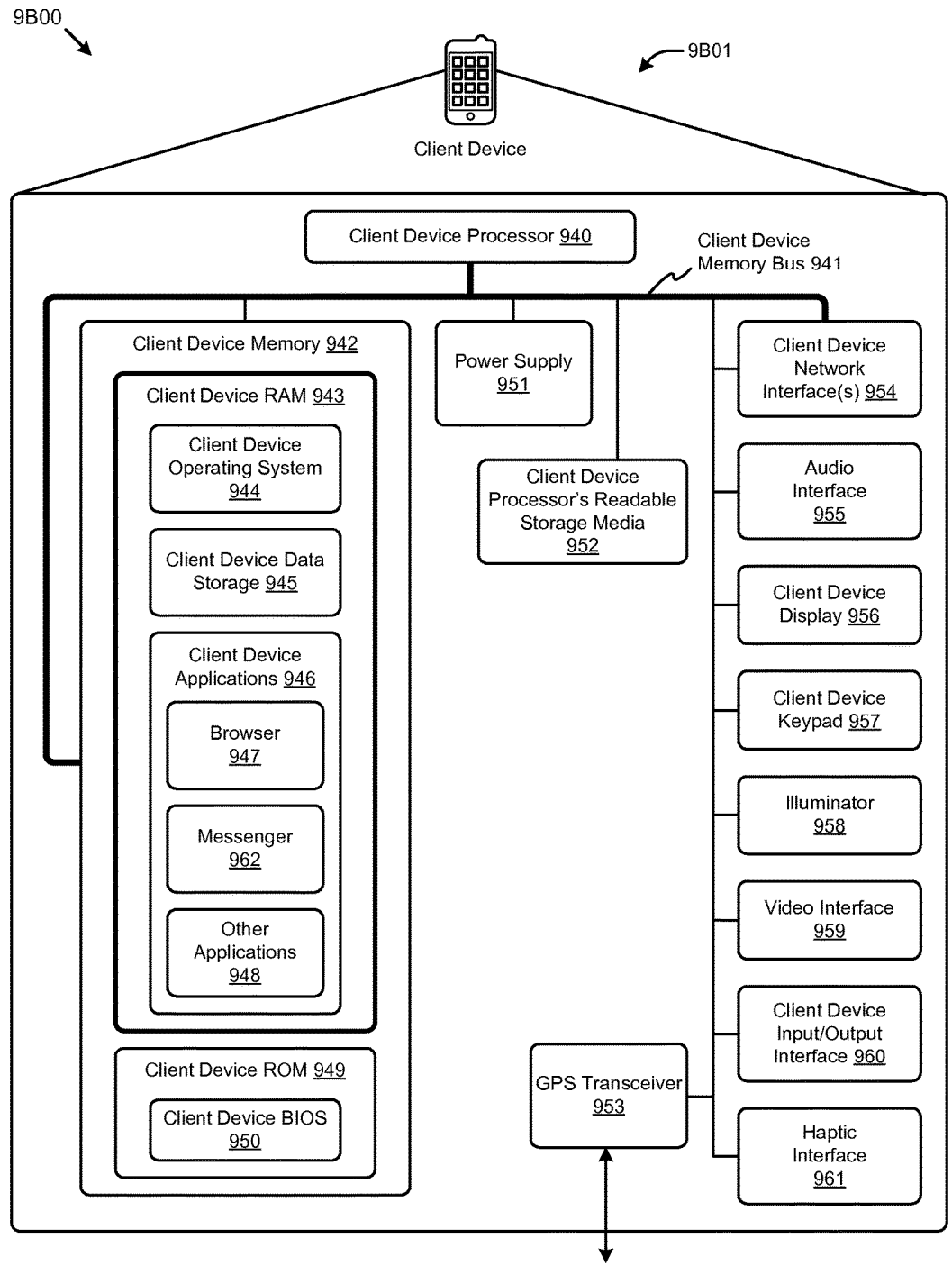

FIG. 9B depicts a block diagram 9B00 of an instance of a client device 9B01 that may be included in a system implementing instances of the herein-disclosed embodiments. Client device 9B01 may include many more or fewer components than those shown in FIG. 9B. Client device 9B01 may represent, for example, one embodiment of at least one of client devices as heretofore disclosed.

As shown in the figure, client device 9B01 includes a processor 940 in communication with a client device memory 942 via a client device memory bus 941. Client device 9B01 also includes a power supply 951, one or more client device network interfaces 954, an audio interface 955, a client device display 956, a client device keypad 957, an illuminator 958, a video interface 959, a client device IO interface 960, a haptic interface 961, and a GPS transceiver 953 for global positioning services.

The power supply 951 provides power to client device 9B01. A rechargeable or non-rechargeable battery may be used to provide power. The power may also be provided by an external power source such as an AC adapter or a powered docking cradle that supplements and/or recharges a battery.

Client device 9B01 may optionally communicate with a base station, or directly with another computing device. A client device network interface 954 includes circuitry for coupling client device 9B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 954 is sometimes known as a transceiver, a transceiving device, or a network interface card (NIC).

An audio interface 955 is arranged to produce and receive audio signals such as the sound of a human voice. For example, audio interface 955 may be coupled to a speaker and microphone to enable telecommunication with others and/or generate an audio acknowledgement for some action.

A client device display 956 may be a liquid crystal display (LCD), gas plasma, light emitting diode (LED), or any other type of display used with a computing device. A client device display 956 may also include a touch sensitive screen arranged to receive input from an object such as a stylus or a digit from a human hand.

A client device keypad 957 may comprise any input device arranged to receive input from a user. For example, client device keypad 957 may include a push button numeric dial, or a keyboard. A client device keypad 957 may also include command buttons that are associated with selecting and sending images.

An illuminator 958 may provide a status indication and/or provide light. Illuminator 958 may remain active for specific periods of time or in response to events. For example, when the illuminator 958 is active, it may backlight the buttons on client device keypad 957 and stay on while the client device is powered. Also, the illuminator 958 may backlight these buttons in various patterns when particular actions are performed such as dialing another client device. An illuminator 958 may also cause light sources positioned within a transparent or translucent case of the client device to illuminate in response to actions.

A video interface 959 is arranged to capture video images such as a still photo, a video segment, an infrared video or the like. For example, the video interface 959 may be coupled to a digital video camera, a web-camera or the like. A video interface 959 may comprise a lens, an image sensor, and other electronics. Image sensors may include a complementary metal-oxide-semiconductor (CMOS) integrated circuit, charge-coupled device (CCD), or any other integrated circuit for sensing light.

Client device 9B01 also comprises a client device IO interface 960 for communicating with external devices such as a headset, or other input or output devices not shown in FIG. 9B. The client device IO interface 960 can use one or more communication technologies such as a USB, infrared, Bluetooth™ port or the like. A haptic interface 961 is arranged to as a human interface device (HID) to facilitate interaction with a user of a client device. Such interaction can include tactile feedback to a user of the client device. For example, the haptic interface 961 may be employed to vibrate client device 9B01 in a particular way (e.g., with a pattern or periodicity) and/or when interacting with another user.

A GPS transceiver 953 can determine the physical coordinates of client device 9B01 on the surface of the Earth. The GPS transceiver 953, in some embodiments, may be optional. The shown GPS transceiver 953 outputs a location such as a latitude value and a longitude value. However, the GPS transceiver 953 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 9B01 on the surface of the Earth. It is understood that under different conditions, a GPS transceiver 953 can determine a physical location within millimeters for client device 9B01; and in other cases, the determined physical location may be less precise such as within a meter or significantly greater distances. In one embodiment, however, the client device 9B01 may provide other information that may be employed to determine a physical location of the device including, for example, a media access control (MAC) address, IP address, IP port identifier, or the like.

The client device memory 942 includes random access memory 943, read-only memory 949, and other storage means. The client device memory 942 illustrates an example of computer readable storage media (devices) for storage of information such as computer readable instructions, data structures, program modules or other data. The client device memory 942 stores a basic IO system (BIOS) in the embodiment of client device BIOS 950 for controlling low-level operation of client device 9B01. The memory also stores an operating system 944 for controlling the operation of client device 9B01. It will be appreciated that this component may include a general-purpose operating system such as a version of UNIX, or LINUX™, or a specialized client communication operating system such as Microsoft Corporation's Windows Mobile™, Apple Corporation's iOS™ Google Corporation's Android™, or the Symbian® operating system. The operating system may include, or interface with a Java virtual machine module that enables control of hardware components and/or operating system operations via Java application programs.

The client device memory 942 further includes one or more instances of client device data storage 945, which can be used by client device 9B01 to store, among other things, client device applications 946 and/or other data. For example, client device data storage 945 may also be employed to store information that describes various capabilities of client device 9B01. The information may then be provided to another device based on any of a variety of events including being sent as part of a header during a communication, sent upon request or the like. Client device data storage 945 may also be employed to store social networking information including address books, buddy lists, aliases, user profile information or the like. Further, client device data storage 945 may also store messages, web page content, or any of a variety of content (e.g., received content, user generated content, etc.).

At least a portion of the information may also be stored on any component or network device including, but not limited, to a client device processor's readable storage media 952, a disk drive or other computer readable storage devices within client device 9B01, etc.

An instance of a client device processor's readable storage media 952 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media 952 may also be referred to herein as computer readable storage media.

The client device applications 946 may include computer executable instructions which, when executed by client device 9B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 946 may include, for example, a messenger 962, a browser 947, and other applications 948. Certain other applications 948 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 948 may collect and store user data that may be received from other computing devices in the environment.

A messenger 962 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in an embodiment, the messenger 962 may be configured as an IM application such as AOL (America Online) instant messenger, Yahoo! messenger, .NET messenger server, ICQ or the like. In one embodiment, the messenger 962 may be configured to include a mail user agent (MUA) such as Elm, Pine, message handling (MH), Outlook, Eudora, Mac Mail, Mozilla Thunderbird or the like. In another embodiment, the messenger 962 may be a client device application that is configured to integrate and employ a variety of messaging protocols including, but not limited to, various push and/or pull mechanisms for client device 9B01. In one embodiment, the messenger 962 may interact with the browser 947 for managing messages. As used herein, the term "message" refers to any of a variety of messaging formats, or communications form including, but not limited to, email, SMS, IM, MMS, IRC or the like.

A browser 947 may include virtually any application configured to receive and display graphics, text, multimedia, messages and the like, employing virtually any web based language. In one embodiment, the browser application is enabled to employ HDML, WML, WMLScript, JavaScript, SGML, HTML, XML and the like, to display and send a message. However, any of a variety of other web-based programming languages may be employed. In one embodiment, a browser 947 may enable a user of client device 9B01 to communicate with another network device as may be present in the environment.

Figure 9C:
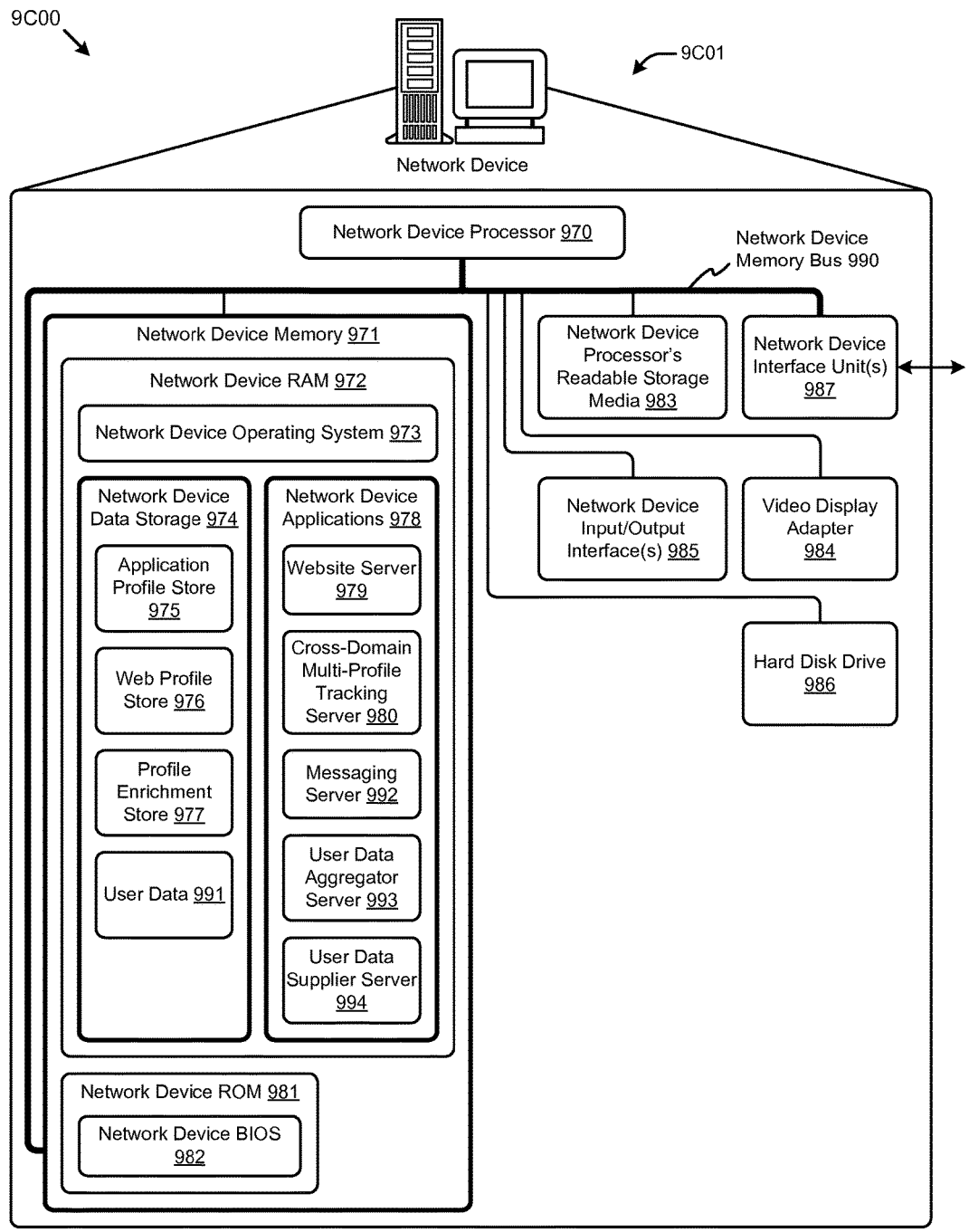

FIG. 9C depicts a block diagram 9C00 of an instance of a network device 9C01 that may be included in a system implementing instances of the herein-disclosed embodiments. Network device 9C01 may include many more or fewer components than those shown. Network device 9C01 may be configured to operate as a server, client, peer, a host, or any other device.

Network device 9C01 includes at least one instance of a network device processor 970, instances of readable storage media 983, network interface unit 987, a network device IO interface 985, a hard disk drive 986, a video display adapter 984, and a network device memory 971, all in communication with each other via a network device memory bus 990. The network device memory generally includes network device RAM 972, network device ROM 981. Some embodiments include one or more non-volatile mass storage devices such as a hard disk drive 986, a tape drive, an optical drive, and/or a floppy disk drive. The network device memory stores a network device operating system 973 for controlling the operation of network device 9C01. Any general-purpose operating system may be employed. A basic IO system (BIOS) is also provided in the form of network device BIOS 982 for controlling the low-level operation of network device 9C01. As illustrated in FIG. 9C, a network device 9C01 also can communicate with the Internet, or some other communications network, via a network interface unit 987, which is constructed for use with various communication protocols including the TCP/IP protocol. The network interface unit 987 is sometimes known as a transceiver, a transceiving device, or a network interface card (NIC).

Network device 9C01 also comprises a network device IO interface 985 for communicating with external devices such as a keyboard or other input or output devices. A network device IO interface 985 can use one or more communication technologies such as USB, infrared, Bluetooth™ or the like.

The storage devices as described above may use various types of computer readable media, namely non-volatile computer readable storage media and/or a client device processor's readable storage media 983 and/or a network device processor's readable storage media 983. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 974 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 974 may further include program code, data, algorithms and the like, for use by a processor such as a network device processor 970 to execute and perform actions. In one embodiment, at least some of the logical contents of network device data storage 974 might be stored on another component of network device 9C01, such as on a second instance of hard disk drive 986 or on an external/removable storage device.

The network device data storage 974 may further store any portions of application data and/or user data such as an application profile store 975, a web profile store 976, a profile enrichment store 977 and/or any user data collected. In some embodiments, user data 991 may store unique user data, non-unique user data, aggregated user data, and/or any combination thereof. User data 991 may include a variety of attributes such as a five digit zip code, an expanded nine digit zip code and the like.

The Network device data storage 974 may also store program code and data. One or more network device applications 978 may be loaded into network device data storage or any other mass memory, to be accessible to run with or as a part of network device operating system 973. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 992, website server 979, user data aggregator server 993, a cross-domain multi-profile tracking server 980, and/or user data supplier server 994 may also be included within or implemented as application programs.

A messaging server 992 may include virtually any computing component or components configured and arranged to forward messages from message user agents and/or other message servers, or to deliver messages to a local message store such as network device data storage 974 or the like. Thus, a messaging server 992 may include a message transfer manager to communicate a message employing any of a variety of email protocols including, but not limited to, simple mail transfer protocol (SMTP), post office protocol (POP), Internet message access protocol (IMAP), network new transfer protocol (NNTP) or the like. A messaging server 992 may also be managed by one or more components of the messaging server 992. Thus, the messaging server 992 may also be configured to manage SMS messages; IM, MMS, IRC, or RSS feeds; mIRC; or any of a variety of other message types. In one embodiment, the messaging server 992 may enable users to initiate and/or otherwise conduct chat sessions, VOIP sessions or the like.

A website server 979 may represent any of a variety of information and services that are configured to provide content, including messages, over a network to another computing device. Thus, a website server 979 can include, for example, a web server, a file transfer protocol (FTP) server, a database server, a content server or the like. A website server 979 may provide the content including messages over the network using any of a variety of formats including, but not limited to WAP, HDML, WML, SGML, HTML, XML, compact HTML (cHTML), extensible HTML (xHTML) or the like. A website server 979 may also be configured to enable a user of a client device to browse websites, upload user data, view and interact with advertisements or the like.

A user data aggregator server 993 is configured to aggregate user data to be provided to user data buyers for advertising campaigns. In one embodiment, a user data aggregator server 993 may be configured to receive collected user data from a user data supplier server 994. In some embodiments, a user data aggregator server 993 may receive a query for user data. Based on the query, a user data aggregator server 993 may generate a plurality of subsets of aggregated user data. In some embodiments, user data aggregator server 993 may be included in a network device.

A user data supplier server 994 is configured to collect user data. In one embodiment, the user data supplier server 994 may be configured to provide the collected user data to user data aggregator server 993. In some embodiments, the user data supplier server 994 may collect and/or provide unique user data and/or non-unique user data. In one embodiment, the user data supplier server 994 may aggregate the collected user data. In some embodiments, the user data supplier server 994 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network including any sub-networks and/or wireless networks are in communication with, and enables communication between each of the components the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In one embodiment, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In one embodiment, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In one embodiment, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In one embodiment, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between another computing device or network.

Any of the foregoing networks can be configured to couple network devices with other computing devices and communication can include communicating between the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices could be remotely connected to either LANs or WANs via a modem and temporary telephone link. In one embodiment, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method for offline operation of a client application on a client device using a client-local database of online activity records, the method comprising:
   receiving, from a networked component, computer code comprising at least a portion of an emulator processing entity to execute on the client device, the emulator processing entity comprising:
      a capture module that allocates memory on the client device that stores a relationship associating at least one online request and at least one online response into a client-local database,
      wherein the relationship comprises at least a timestamp column corresponding to an indicator of a freshness of data of the relationship between the at least one online request and respective at least one online response, and at least a data row corresponding to the online response generated from the online request, and
      an emulator module that receives an offline request from the client application and delivers an offline response to the client application when the client device is disconnected from the networked component, the offline response retrieved from the client-local database based at least in part on the relationship associated between the at least one online request and the at least one online response;
   sending one or more online requests from the client application on the client device to the networked component;
   receiving one or more online responses from the networked component, the one or more online responses to the client application being responsive to at least one of the one or more online requests;
   storing, into the client-local database of online activity records, one or more relationships between the one or more online requests and respective one or more online responses, at least one of an entirety of the online requests from the client device and online responses from the networked component, and a relationship between a second online request and first online request;

retrieving, by the emulator module on the client device, stored instances of the respective one or more online responses from the client-local database based at least in part on the one or more relationships associated to one or more offline requests received from the client application;

receiving instructions for deploying a crawler processing entity to the client device, wherein the crawler processing entity is configured to generate a set of simulated online requests when the client device is connected to the networked component, the set of simulated online requests producing a wide range of request-response pairs, wherein the wide range of request-response pairs depend from one or more previous request-response pairs;

storing, into the client-local database, the set of simulated online requests, wherein the simulated online requests generate additional online activity records and are accessible when the client device is disconnected from the networked component; and operating the client application in an offline mode when the client device is disconnected from the networked component by delivering the respective one or more online responses from the client-local database to the client application as one or more offline responses.

2. The method of claim 1, wherein the emulator processing entity is configured to process one or more occurrences of subsequent requests to produce offline responses when the client device is disconnected from a network.

3. The method of claim 2, wherein the emulator processing entity serves to retrieve stored instances of the one or more online responses based at least in part on a one-to-one relationship with the subsequent request.

4. The method of claim 2, wherein the emulator processing entity is configured to deliver one or more offline responses to the client application when the client device is disconnected from an application server.

5. The method of claim 1, wherein one or more online requests and one or more offline responses has a JSON format.

6. The method of claim 5, further comprising storing at least some data relationships based on a JSON-formatted online request and one or more JSON-formatted offline responses.

7. The method of claim 1, further comprising receiving instructions for simulating online requests when the client device is connected to the network component.

8. A computer program product, embodied in a non-transitory computer readable medium, the non-transitory computer readable medium having stored thereon a sequence of instructions which, when stored in memory and executed by a processor causes the processor to execute a process for offline operation of a client application on a client device using a client-local database of online activity records, the process comprising:

receiving, from a networked component, computer code comprising at least a portion of an emulator processing entity to execute on the client device, the emulator processing entity comprising:

a capture module that allocates memory on the client device that stores a relationship associating at least one online request and at least one online response into a client-local database, wherein the relationship comprises at least a timestamp column corresponding to an indicator of a freshness of data of the relationship between the at least one online request and respective at least one online response, and at least a data row corresponding to the online response generated from the online request, and an emulator module that receives an offline request from the client application and delivers an offline response to the client application when the client device is disconnected from the networked component, the offline response retrieved from the client-local database based at least in part on the relationship associated between the at least one online request and the at least one online response;

sending one or more online requests from the client application on the client device to the networked component;

receiving one or more online responses from the networked component, the one or more online responses to the client application being responsive to at least one of the one or more online requests;

storing, into the client-local database of online activity records, one or more relationships between the one or more online requests and respective one or more online responses, at least one of an entirety of the online requests from the client device and online responses from the networked component, and a relationship between a second online request and first online request;

retrieving, by the emulator module on the client device, stored instances of the respective one or more online responses from the client-local database based at least in part on the one or more relationships associated to one or more offline requests received from the client application;

receiving instructions for deploying a crawler processing entity to the client device, wherein the crawler processing entity is configured to generate a set of simulated online requests when the client device is connected to the networked component, the set of simulated online requests producing a wide range of request-response pairs, wherein the wide range of request-response pairs depend from one or more previous request-response pairs;

storing, into the client-local database, the set of simulated online requests, wherein the simulated online requests generate additional online activity records and are accessible when the client device is disconnected from the networked component; and operating the client application in an offline mode when the client device is disconnected from the networked component by delivering the respective one or more online responses from the client-local database to the client application as one or more offline responses.

9. The computer program product of claim 8, wherein the emulator processing entity is configured to process one or more occurrences of subsequent requests to produce offline responses when the client device is disconnected from a network.

10. The computer program product of claim 9, wherein the emulator processing entity serves to retrieve stored instances of the one or more online responses based at least in part on a one-to-one relationship with the subsequent request.

11. The computer program product of claim 9, wherein the emulator processing entity is configured to deliver one or more offline responses to the client application when the client device is disconnected from an application server.

12. The computer program product of claim 8, wherein one or more online requests and one or more offline responses has a JSON format.

13. The computer program product of claim 12, further comprising instructions to cause the process to store at least some data relationships based on a JSON-formatted online request and one or more JSON-formatted offline responses.

14. The computer program product of claim 8, further comprising instructions to cause the process to receive instructions for simulating online requests when the client device is connected to the networked component over a network.

15. A system for offline operation of a client application on a client device using a client-local database of online activity records, the system comprising:
- a networked component comprising:
  - a backend system comprising an application server, and
  - a database engine storing application data; and
- a client device comprising:
  - a computer processor to execute a set of program code instructions, and
  - a memory to hold the set of program code instructions, in which the set of program code instructions comprises program code to perform:
    - receiving, from a networked component, computer code comprising at least a portion of an emulator processing entity to execute on the client device, the emulator processing entity comprising:
      - a capture module that allocates memory on the client device that stores a relationship associating at least one online request and at least one online response into a client-local database, wherein the relationship comprises at least a timestamp column corresponding to an indicator of a freshness of data of the relationship between the at least one online request and respective at least one online response, and at least a data row corresponding to the online response generated from the online request, and
      - an emulator module that receives an offline request from the client application and delivers an offline response to the client application when the client device is disconnected from the networked component, the offline response retrieved from the client-local database based at least in part on the relationship associated between the at least one online request and the at least one online response;
    - sending one or more online requests from the client application on the client device to the networked component;
    - receiving one or more online responses from the networked component, the one or more online responses to the client application being responsive to at least one of the one or more online requests;
    - storing, into the client-local database of online activity records, one or more relationships between the one or more online requests and respective one or more online responses, at least one of an entirety of the online requests from the client device and online responses from the networked component, and a relationship between a second online request and first online request;
    - retrieving, by the emulator module on the client device, stored instances of the respective one or more online responses from the client-local database based at least in part on the one or more relationships associated to one or more offline requests received from the client application;
    - receiving instructions for deploying a crawler processing entity to the client device, wherein the crawler processing entity is configured to generate a set of simulated online requests when the client device is connected to the networked component, the set of simulated online requests producing a wide range of request-response pairs, wherein the wide range of request-response pairs depend from one or more previous request-response pairs;
    - storing, into the client-local database, the set of simulated online requests, wherein the simulated online requests generate additional online activity records and are accessible when the client device is disconnected from the networked component; and
    - operating the client application in an offline mode when the client device is disconnected from the networked component by delivering the respective one or more online responses from the client-local database to the client application as one or more offline responses.

16. The system of claim 15, wherein the emulator processing entity is configured to process one or more occurrences of subsequent requests to produce offline responses when the client device is disconnected from a network.

17. The system of claim 16, wherein the emulator processing entity serves to retrieve stored instances of the one or more online responses based at least in part on a one-to-one relationship with the subsequent request.

18. The system of claim 16, wherein the emulator processing entity is configured to deliver one or more offline responses to the client application when the client device is disconnected from an application server.

19. The system of claim 15, wherein one or more online requests and one or more offline responses has a JSON format.

20. The system of claim 19, wherein the set of program code instructions further comprises storing at least some data relationships based on a JSON-formatted online request and one or more JSON-formatted offline responses.

21. The system of claim 15, wherein the set of program code instructions further comprises program code to perform receiving instructions for simulating online requests when the client device is connected to the networked component over a network.

* * * * *

UNITED STATES PATENT AND TRADEMARK OFFICE
CERTIFICATE OF CORRECTION

PATENT NO. : 9,917,923 B2
APPLICATION NO. : 14/791139
DATED : March 13, 2018
INVENTOR(S) : Javed et al.

Page 1 of 1

It is certified that error appears in the above-identified patent and that said Letters Patent is hereby corrected as shown below:

On the Title Page

Column 2, item (56), under Other Publications, Line 2, delete "InInternational" and insert -- In International --, therefor.

In the Specification

In Column 8, Line 44, delete "3B 100" and insert -- 3B100 --, therefor.

Signed and Sealed this
Twenty-eighth Day of August, 2018

Andrei Iancu
*Director of the United States Patent and Trademark Office*